(12) United States Patent
Sandgren et al.

(10) Patent No.: US 11,785,568 B2
(45) Date of Patent: Oct. 10, 2023

(54) OPTIMIZING USAGE OF A COORDINATED SERVICE

(71) Applicant: Telefonaktiebolaget LM Ericsson (publ), Stockholm (SE)

(72) Inventors: Magnus Sandgren, Staffanstorp (SE); Garry Irvine, Ottawa (CA); Walter Müller, Upplands Väsby (SE); Christer Östberg, Staffanstorp (SE); Torgny Palenius, Barsebäck (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 1 day.

(21) Appl. No.: 16/975,583

(22) PCT Filed: Nov. 19, 2018

(86) PCT No.: PCT/SE2018/051193
§ 371 (c)(1),
(2) Date: Aug. 25, 2020

(87) PCT Pub. No.: WO2019/164430
PCT Pub. Date: Aug. 29, 2019

(65) Prior Publication Data
US 2020/0396706 A1 Dec. 17, 2020

Related U.S. Application Data

(60) Provisional application No. 62/635,238, filed on Feb. 26, 2018.

(51) Int. Cl.
*H04W 56/00* (2009.01)
*H04L 27/26* (2006.01)

(52) U.S. Cl.
CPC ....... *H04W 56/002* (2013.01); *H04L 27/2607* (2013.01); *H04W 56/003* (2013.01); *H04W 56/0045* (2013.01)

(58) Field of Classification Search
CPC .............. H04W 8/005; H04W 36/008; H04W 36/0061; H04W 36/0083
See application file for complete search history.

(56) References Cited

U.S. PATENT DOCUMENTS

| 9,907,059 B1* | 2/2018 | Zhou ................. H04W 72/0413 |
| 2008/0117835 A1* | 5/2008 | Grilli .................. H04B 7/2668 370/252 |
| 2013/0279433 A1 | 10/2013 | Dinan |
| 2014/0192921 A1* | 7/2014 | Wang ................. H04L 27/2646 375/295 |

(Continued)

FOREIGN PATENT DOCUMENTS

| CN | 101444012 A | 5/2009 |
| CN | 102571672 A | 7/2012 |

OTHER PUBLICATIONS

International Search Report and Written Opinion issued in international Application No. PCT/SE2018/051193 dated Feb. 1, 2019 (9 pages).

(Continued)

*Primary Examiner* — San Htun
(74) *Attorney, Agent, or Firm* — Rothwell, Figg, Ernst & Manbeck, P.C.

(57) ABSTRACT

In some embodiments, a network node (e.g., a base station) collects information pertaining to components that form a Maximum Received Timing Difference (MRTD). For instance, the network node determines TAE. The network node then evaluates, for a particular UE, whether a certain MRTD requirement (MRTDR) for a specific coordinated service (CS) can be fulfilled. If the requirement can be met, then the network node may initiate the specific CS for the UE (or continue providing the CS), and if the requirement cannot be met, then the network node may stop or modify the CS for the UE.

18 Claims, 25 Drawing Sheets

(56) References Cited

U.S. PATENT DOCUMENTS

2016/0345316 A1* 11/2016 Kazmi .............. H04W 56/0045
2017/0034786 A1 2/2017 Christensson et al.
2018/0062801 A1* 3/2018 Zhang .................. H04J 11/0053

OTHER PUBLICATIONS

3GPP TS 36.133 version 15.3.0 Release 15; ETSI TS 136 133 V15.3.0 (Oct. 2018); LTE; Evolved Universal Terrestrial Radio Access (E-UTRA); Requirements for support, of radio resource management, Oct. 2018, (3,024 pages).

3GPP TS 36.104 V15.3.0 (Jun. 2018); 3rd Generation Partnership Project; Technical Specification Group Radio Access Network; Evolved Universal Terrestrial Radio Access (E-UTRA); Base Station (BS) radio transmission and receiption (Release 15), Jun. 2018 (293 pages).

3GPP TS 28.632 V12.0.1 (Oct. 2014); 3rd Generation Partnership Project; Technical Specification Group Services and System Aspects; Telecommunication management; Inventory Management (IM) Network Resource Model (NRM) Integration Reference Point (IRP); Information Service (IS) (Release 12) Oct. 2014 (25 pages).

3GPP TR 36.815 V9.1.0 (Jun. 2010); 3rd Generation Partnership Project; Technical Specification Group Radio Access Network; Further advancements for E-UTRA; LTE-Advanced feasibility studies in RAN WG4 (Release 9) Jun. 2010 (29 pages).

LG Electronics, "Discussion on MRTD and MTTD for inter-band synchronous EN-DC", 3GPP TSG-RAN WG4#86 Meeting, R4-1802421, Athens, Greece, Feb. 26-Mar. 2, 2018 (6 pages).

LG Electronics, "Discussion on MRTD and MTTD for synchronous EN-DC", 3GPP TSG-RAN WG4 NR AH 1801, R4-1800515, San Diego, CA, USA Jan. 22-25, 2018, (4 pages).

Huewei et al., "Further discussion on the impacts of CA on V2X requirements"; 3GPP TSG-RAN WG4 Meeting #85, R4-1713305, Reno, USA, Nov. 27-Dec. 1, 2017 (4 pages).

* cited by examiner

Single UE transmission and BS time stamping

OPTIMIZING USAGE OF A COORDINATED SERVICE

CROSS REFERENCE TO RELATED APPLICATION(S)

This application is a 35 U.S.C. § 371 National Stage of International Patent Application No. PCT/SE2018/051193, filed Nov. 19, 2018, designating the United States and claiming priority to U.S. provisional application No. 62/635, 238, filed on Feb. 26, 2018. The above identified applications are incorporated by reference.

TECHNICAL FIELD

Disclosed are embodiments related to optimizing usage of a coordinated service.

INTRODUCTION

Generally, a coordinated service is a network service that involves the simultaneous transmission of data to a user equipment (UE) from two or more transmission and reception points (TRPs) (e.g., 3GPP base stations, Wi-Fi access points, etc.). This concept is illustrated in FIG. 1. As used herein a UE is a wireless communication device, such as, for example, a smartphone, a tablet, a phablet, a smart sensor, a wireless Internet-of-Things (IoT) device, etc.) that is capable of wirelessly communicating with a TRP.

Different coordinated services can have somewhat different purposes, such as, i) increasing throughput by, for example, aggregating different parts of the RF spectrum, ii) increasing coverage at a cell edge by, for example, combining power from several TRPs, and iii) increasing reliability.

Examples of coordinated services in 3GPP are Carrier Aggregation (CA), Dual Connectivity (DC), Coordinated Multi-Point (CoMP), and Multi Broadcast Single Frequency Network (MBSFN). Common for all of these coordinated services is that they must satisfy a Maximum Received Timing Difference (MRTD) requirement. In some scenarios, the MRTD requirement relates to the length of a cyclic prefix (CP). The architecture of the UE is one main factor that determines how strict the MRTD requirement will be.

For example, a UE with a single radio frequency (RF) chain and a common fast fourier transform (FFT) (see e.g., FIG. 2A) will require strict phase alignment and an MRTD that is a fraction of the cyclic prefix. On the other hand, a UE with more than one RF chain and an FFT for each chain (see e.g., FIG. 2B) does not necessary imply any strict requirement. The UE shown in FIG. 2A corresponds to option "A" in [1] Table 5.3.3-1. The UE shown in FIG. 2B corresponds to what is called option "B."

Intra-band contiguous CA is specified in [2] with a base station relative Time Alignment Error (TAE) of 130 ns between transmission points. This equals approx. 2.5% of CP in LTE. This requirement is based on a UE architecture with common FFT. Since the transmissions are separated in frequency, other UE architectures (like the one shown in FIG. 2B) would not necessarily need a strict timing requirement related to the CP.

Dual Connectivity (DC) could somewhat be considered an exception since it supports an asynchronous or a synchronous mode of operation dependent UE, but levels are rough and for synchronous mode several options could exist (especially intra band DC as discussed in Rel15).

For CoMP (Joint Transmission-Joint Reception) or similar technologies, there is a fundamental difference since the same information is transmitted from the base stations on the same frequency-time resources. This means that a strict relation to the CP would be expected for all UEs, regardless of the UE architecture employed. An exception would be a potential complex UE architecture separating the streams in spatial domain. Such implementation, if possible, would drive cost, power consumption and complexity, which is generally not desired for UEs. In this context CoMP is similar to MBSFN but the latter uses an extended CP (ECP).

For the strictest services (e.g., CoMP) with a relation to the CP, the MRTD can be expressed as: MRTD=TAE+ΔTprop+DS-Max.

Timing Alignment Error (TAE)

The timing alignment error (TAE) is a relative timing alignment error between the base stations involved in providing the coordinated service (CS) to the UE and is defined at the base station Antenna Reference Points (ARPs). GPS (or GNSS) is a common synchronization source for base stations and provide an absolute time reference to GPS time. For coordinated services it is the TAE (i.e., the relative timing alignment error) between nodes involved in the coordinated service that matters. An absolute timing error (TE) e.g. towards GPS time for a single node is sub-optimal since this assumes an equal error distribution. The distance to the synchronization source impacts the accuracy, multiple error sources are part of a complete budget up to each antenna reference points. Different products and deployment environments can have very different possibilities for achieving a cost-efficient synchronization. Requirements for strict timing accuracy can add significant cost to the products, maintenance and its installation.

RF Propagation Time Difference (ΔTprop)

ΔTprop is the difference in RF propagation time, Tprop1–Tprop2 in FIG. 1. This depends of the relative position of the UE, which changes over time due to UE mobility. The deployment also matters, e.g. a smaller ΔTprop is likely between serving neighbours in homogenous deployment than in a heterogeneous deployment (small cell within a large cell).

In the MRTD budget, a small remaining allocation to ΔTprop does mean a very small area where service could be provided (symmetric distances towards the base stations) and hence for good service availability a large allowed ΔTprop is desired.

The Channel Delay Spread (DS)

FIG. 3A and FIG. 3B illustrate a first channel delay spread (DS-1) for the channel between TP 105 and UE 101 and a second channel delay spread (DS-2) for the channel between TP 106 and UE 101. Typically, the channel delay spread and main part of energy must be kept within the cyclic prefix (CP). Significant energy outside the CP when using OFDM, like in LTE and NR, will cause inter symbol interference (ISI) and link quality will degrade. The channel delay spread depends mainly of the specific environment in which the base station operates. Beamforming tends to reduce the channel delay spread.

For CoMP, MBSFN or other similar coordinated services, the delay spread in the respectively paths will still be present but here in addition the TAE+ΔTprop also needs to fit within the CP. This means in practice less available time for the DS since CP can be considered static and fixed (with ECP in MBSFN for dedicated sub frames). MRTD can be expressed as:

MRTD=CP=DSmax+TAE+ΔTprop, where
DSmax=max(DS-1,DS-2).

In reality this means that CoMP or similar services will not work in environments with large DS because due to ISI the UE connection deteriorates more than without using CoMP.

For scenarios without a strict relation to the CP (e.g., separate RF chains) the MRTD can be expressed as: MRTD=TAE+ΔTprop (removing DSmax since individually handled within each RF path)

Sub Carrier Spacing (SCS)

In LTE there is only one Sub Carrier Spacing (SCS) used and the normal CP is fixed and ~4.7 us independent deployed environment (first symbol in a slot is ~5.2 us and for some services like MBSFN there exist an extended CP (ECP) equal to 16.7 us in dedicated sub-frames).

In NR several SCS exists and the CP scales down with increasing SCS (see Table 1).

TABLE 1

NR SCS and CP

| Frequencies | SCS (kHz) | CP (us) |
|---|---|---|
| <6 GHz | 15 | 4.76 |
| <6 GHz | 30 | 2.38 |
| <6 GHz | 60 | 1.19 |
| >24 GHz | 120 | 0.60 |
| >24 GHz | 240 | 0.30 |

From the formula above this also means less available time for components in the MRTD budget.

The SCS used in NR depends of RF carrier frequency range. Frequencies below 6 GHz could use 15, 30 and 60 kHz SCS, frequencies above 24 GHz starts with 60 kHz SCS. Reasons for the increase SCS for higher carrier frequencies is to: mitigate effects of increased Doppler at high carrier frequencies; and reduce impact for e.g. LO phase noise that is a challenge at higher carrier frequencies and impacts Inter Carrier Interference (ICI) in OFDM systems.

A benefit is smaller symbol durations which would allow reduced latency. Normally cell sizes decrease with increased carrier frequency (implying smaller cells and less distance between base stations in a homogenous deployment).

SUMMARY

There currently exist certain challenges. For coordinated services, several parameters form a total timing budget for the MRTD at the UE. None of the parameters can be considered fixed or possible to accurately predict due to many dependencies and thereby large variations. The TAE can vary greatly between products and installations and can even vary over time of the day. The ΔTprop depends on actual deployments (cell sizes, homogenous or heterogeneous) and UE relative position towards the base stations, which of course varies based on UE mobility. The channel delay spread (DS) is mainly a function of the environment in which the base stations operate. Large variations and multitude of combinations exist, even the UE position in the cell matters.

A less accurate TAE does not necessary mean that a coordinated service cannot be provided. For example, a less accurate TAE might not be an issue if other parts of the total budget (e.g., DS and/or the ΔTprop) are small enough (actually a TAE can compensate for Tprop asymmetries and improve MRTD in some cases).

For certain services (e.g., CA) the implemented UE architecture determines whether there exists a strict timing requirement. For example, in LTE 3GPP specification [2], a very strict base station TAE like the 130 ns for contiguous CA or 260 ns non-contiguous CA is specified. 130 ns is only ~2.5% of the LTE CP and would clearly work with less strict TAE in many environments with reasonable large channel delay spreads, even further the requirement is conservative since would only be needed for certain UE implementations (but not reported today so not possible to distinguish).

For intra band non-contiguous and inter band CA the 3GPP specification [3] specifies the MRTD requirement ($MRTD_R$) as 30.26 us. This requirement includes a very strict base station TAE of 260 ns (~0.85% of total budget). The main part 30 us is allocated for a large ΔTprop of 9 km. Clearly in many cases 9 km will not be needed for this service and hence a less strict base station TAE could be allowed.

Making decisions based on isolated requirements for individual components of the MRTD will in most cases be mistake. It could, for example, result in strict worst-case TAE requirements pushed everywhere with additional cost for synchronization without any real gain or need for it, or it could lead to missed service opportunities.

Certain aspects of the present disclosure and their embodiments aim to provide solutions to these or other challenges.

As discussed above, several parameters form the total timing budget for the MRTD at the UE. None of the parameters can be considered fixed or possible to accurately predict due to many dependencies and UE mobility. Therefore the timing budget needs to be evaluated periodically for reevaluations.

The determination as to whether or to initiate a certain coordinated service (CS) from a timing budget perspective is evaluated on a case by case basis including flexible share of the individual components within the MRTD budget. This may result in a more optimal use of the CS compared with, for example, restricting the CS based on a single component (e.g., TAE).

Proposed methods allow a per UE and service evaluation of: whether or not it is worth initiating the coordinated service, whether the coordinated service shall be stopped, and/or whether the coordinated service shall be modified (e.g., moved between the candidate nodes or in beam directions).

Analyzing the components in the timing budget in run time allows ceasing providing the coordinated service before the link deteriorates more than without using the service due to ISI or in due time for finding a more suitable candidate node.

Evaluating margins for the ΔTprop budget would give an indication of further mobility restrictions.

Accordingly, in some embodiments, a network node, e.g., a base station, collects, in run time, information pertaining to the components that form the MRTD. For instance, the network node determines TAE. The network node then evaluates, for a particular UE, whether a certain MRTD requirement ($MRTD_R$) for a specific coordinated service can be fulfilled. If the requirement can be met, then the network node initiates the specific coordinated service for the UE.

For example, in one embodiment the network node may perform the following steps. Step 1—determine the required MRTD ($MRTD_R$). The network node may determine $MRTD_R$ either directly as a function of the coordinated service or if UE reports its capability in device timing classes or potentially even an absolute figure for the required MRTD. Step 2 (optional)—determine the channel delay spread (in specific environment and actual UE position in this environment). Different beam directions may be evaluated also from a delay spread view in addition to received power optimization. Step 3—estimate base station TAE. Step 4—Estimate ΔTprop or steps 1-3 above gives an estimate of an allowed ΔTprop (i.e., a ΔTprop margin) from which conclusions could be made.

In some embodiments, several candidate nodes could be evaluated based on both signal conditions and timing estimates.

In some embodiments, if the timing requirement cannot be met the service is not started for the candidate nodes and a candidate reselection could occur.

In some embodiments the evaluations of MRTD between candidate combinations of nodes for starting new coordinated services are performed periodically to evaluate new combinations of nodes or to stop the ongoing coordinated service. For an ongoing service the service is either stopped before reaching a critical timing level to prevent an overall degradation or a candidate reselection process starts.

In some embodiments, post processing statistics for MRTD budgets and service attempts reveal future potential network improvements with quantification of their benefits.

Certain embodiments may provide one or more of the following technical advantages.

More optimal use of the coordinated service compared with restricting the service based on a single component, like base station absolute TE.

Lower base station costs because there would be no need to design the networks for a generic and strict TAE based on worst case UE, DS and ΔTprop assumptions.

Proposed methods allow per UE and service evaluation as to whether it is worth initiating the service at all and between which candidate nodes.

Analyzing the components in the timing budget in run time allows closing the service before the link deteriorates more than without using the service due to ISI or in due time for finding a more suitable candidate node.

Evaluating margins for the ΔTprop budget would give an indication of further mobility restrictions.

Post-processing statistics from service attempts will reveal where improvements e.g. reduced TAE could improve service and quantify benefits.

BRIEF DESCRIPTION OF THE DRAWINGS

The accompanying drawings, which are incorporated herein and form part of the specification, illustrate various embodiments.

DETAILED DESCRIPTION

Figure 1:
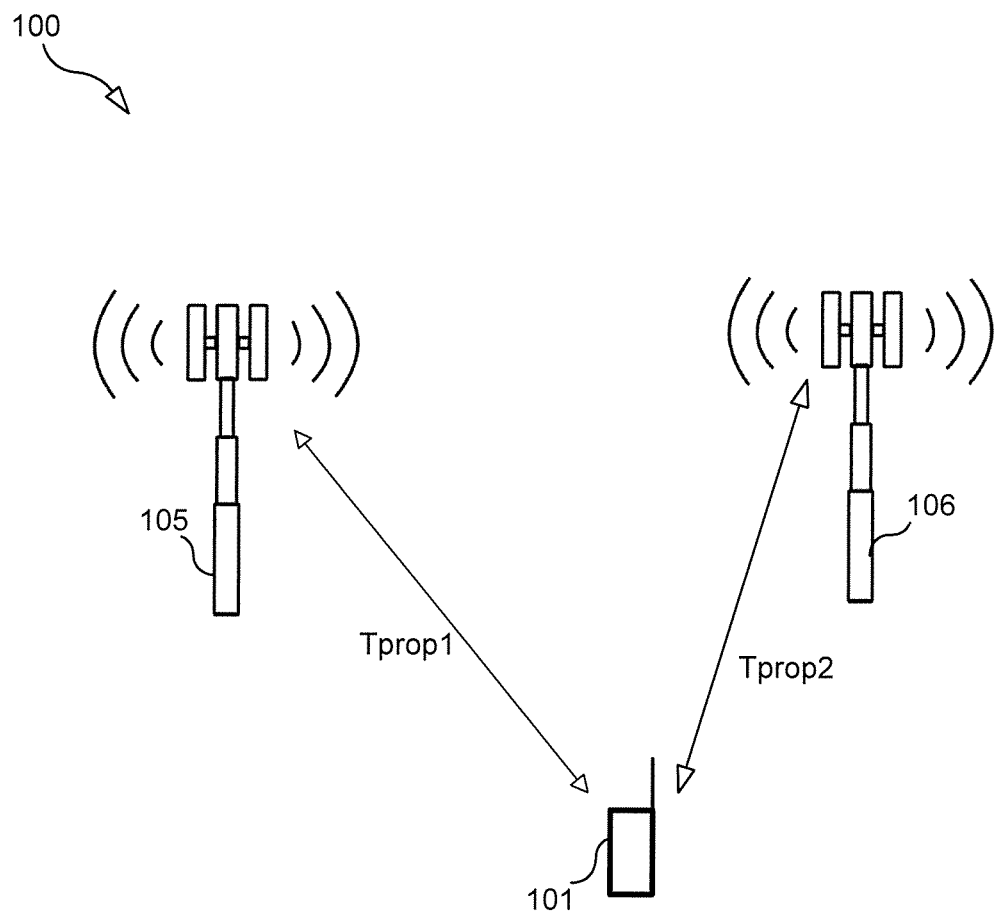
FIG. 1 illustrates an exemplary network.
Figure 2A:
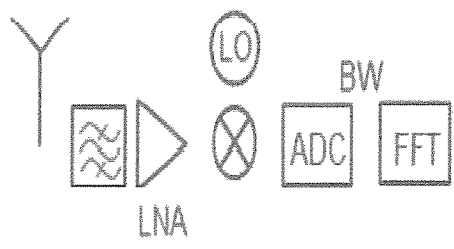
FIG. 2A illustrates a UE architecture.
Figure 2B:
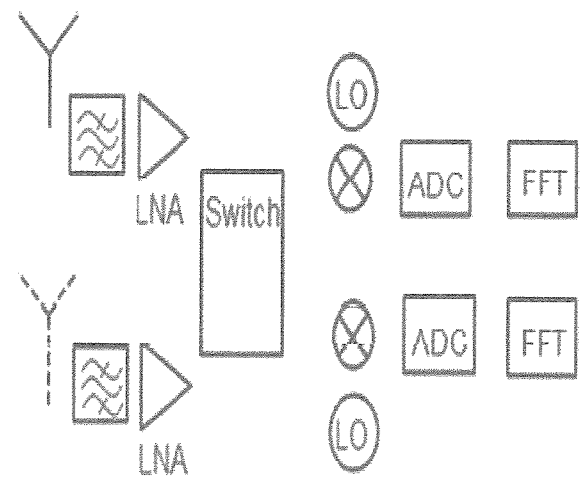
FIG. 2B illustrates another UE architecture.
Figure 3A:
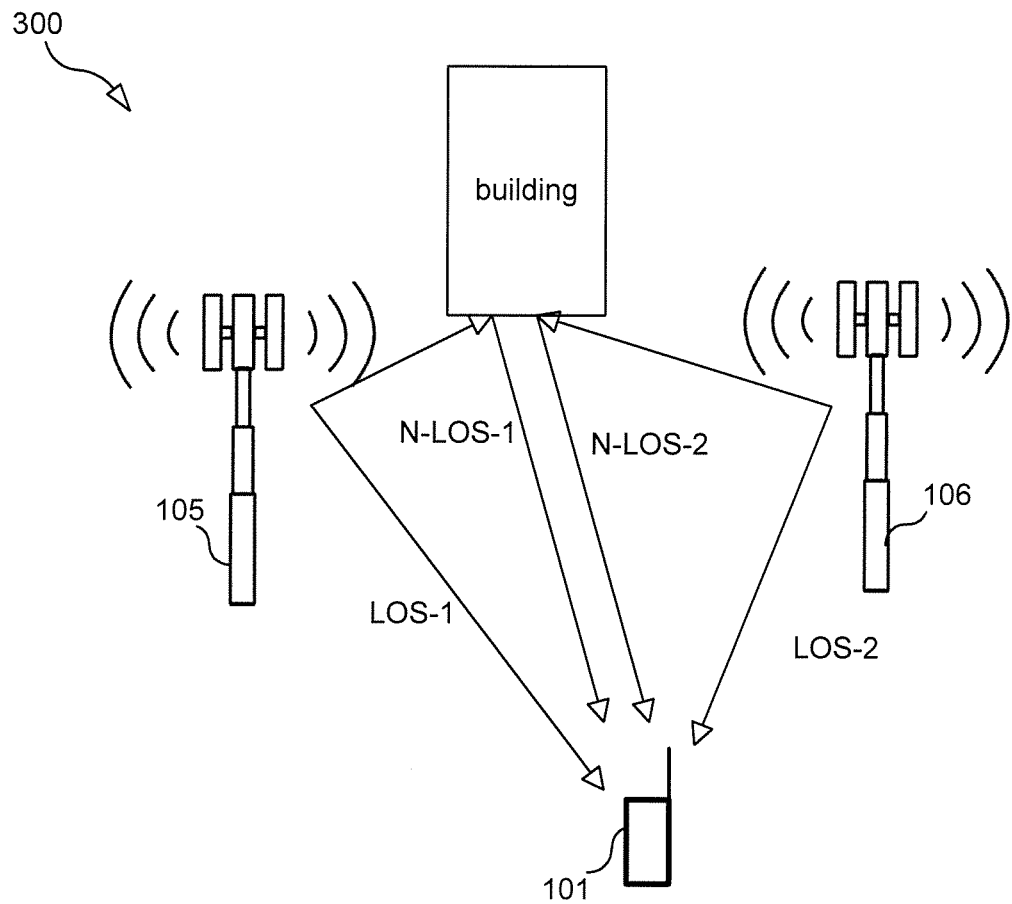
FIG. 3A shows a UE receiving line-of-sight (LOS) and non-LOS signals.
Figure 3B:
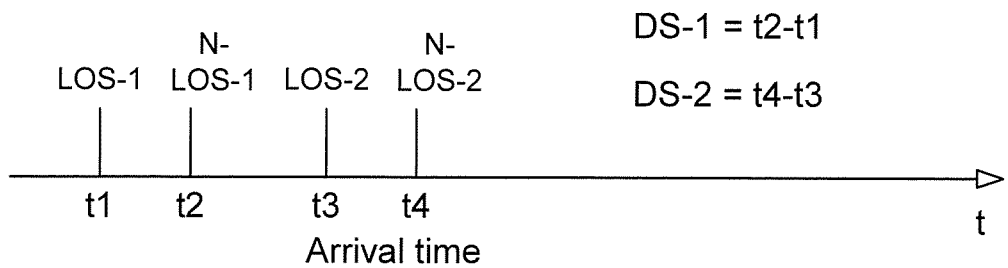
FIG. 3B shows a difference is received signal timing.
Figure 4:
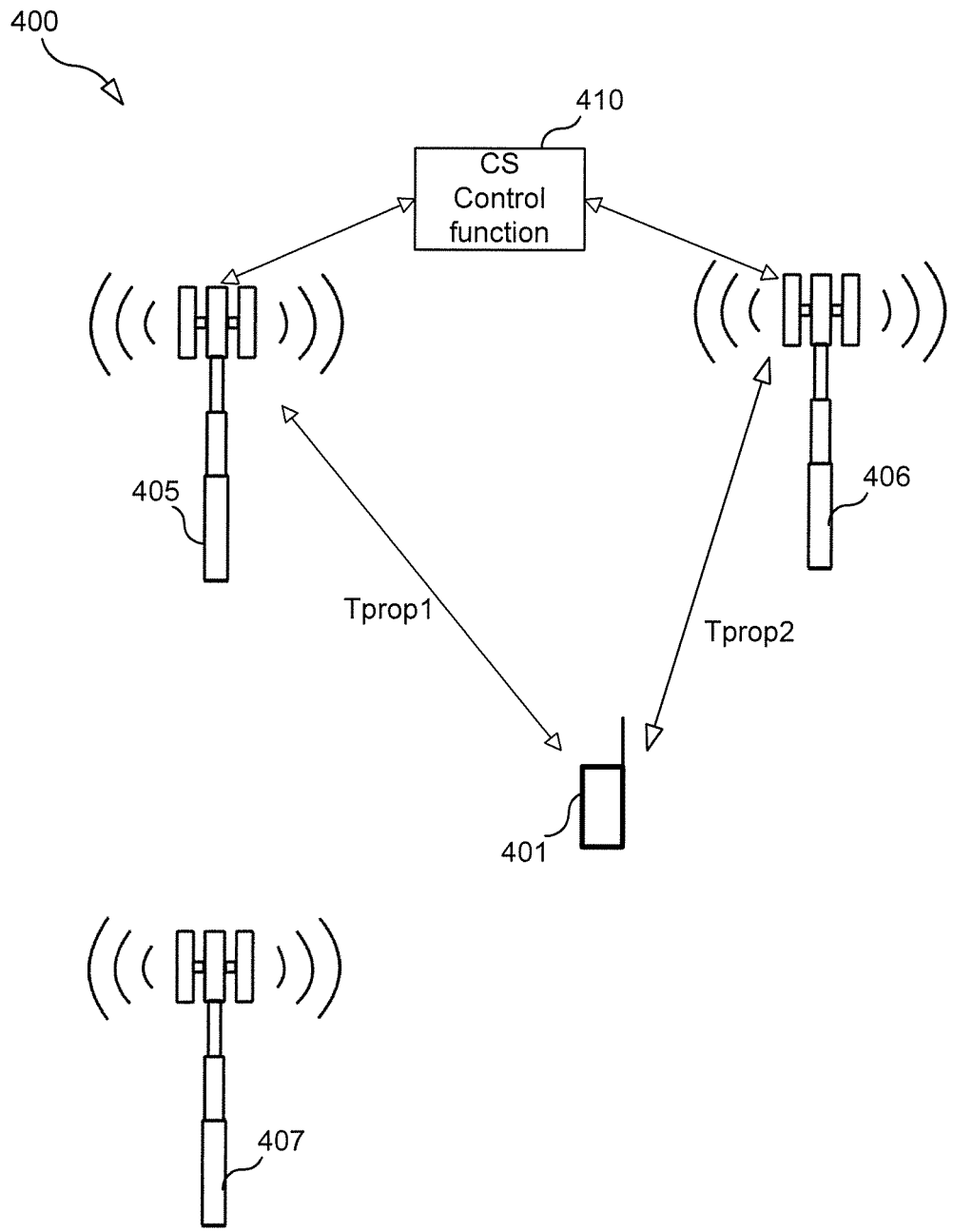
FIG. 4. illustrates an exemplary network according to some embodiments.

FIG. 4 illustrates a network 400 having a number of TRPs (in this example TPR 405, TRP 406, and TRP 407) (e.g., a 4G or 5G base stations or other access points), a UE 401, and a coordinated service (CS) control function 410. CS control function 410 may be a component of a network node that is separate from the TRPs 405 and 406 or some or all of the modules of the CS control function 410 may be a component of one or more of TRP 405, 406 and 407. For example, TRP 405 may be a 3GPP base station and CS control function 410 may be implemented by the 3GPP base station.

In some embodiments, because UE 401's environment changes over time due to mobility and the TAE between TRPs can change over time due to synchronization drift, CS control function 410 functions to periodically evaluate (i.e., evaluate at regular intervals (e.g., every "x" seconds) or evaluate at irregular intervals) whether, for example, it should initiate the providing of a coordinated service to UE 401. Also, if a coordinate service is currently being provided to UE 401 by, for example, TRPs 405 and 406, CS control function 410 functions to periodically evaluate whether to modify the coordinated service, by, for example, ceasing providing the coordinated service or provide the coordinated service using a different pair of TRPs (e.g., TRPs 405 and 407 rather than TRPs 405 and 406).

Figure 5:
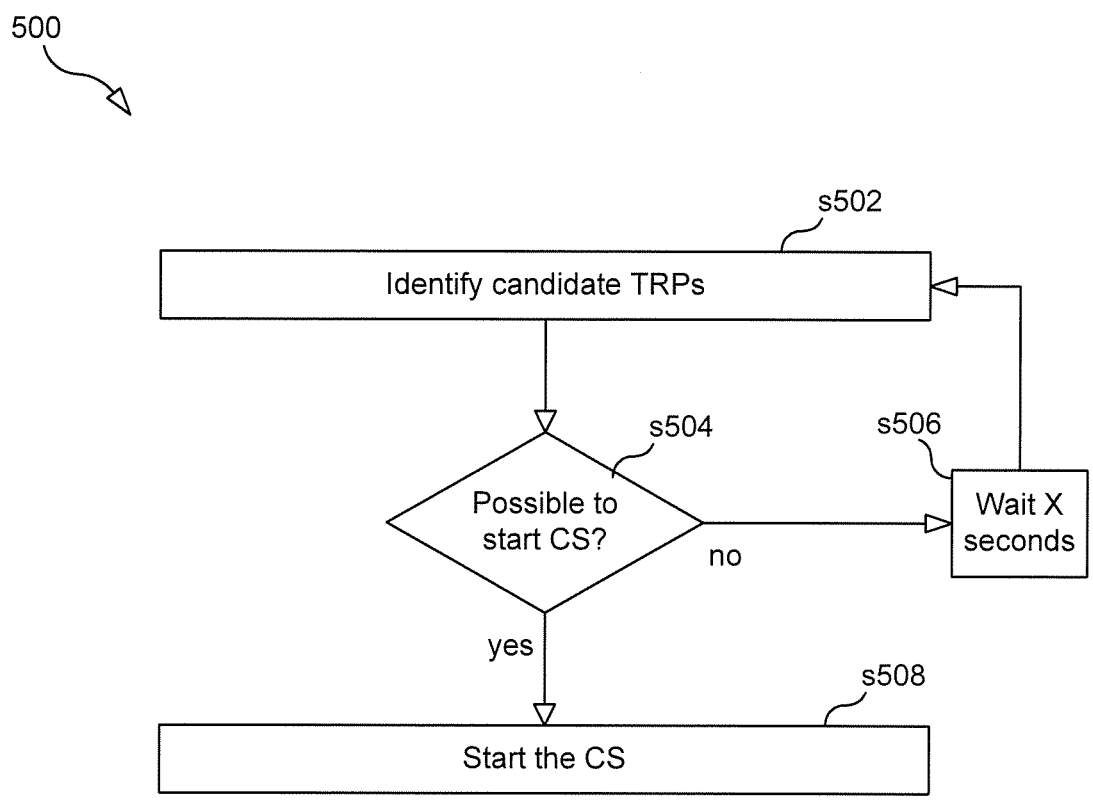
FIG. 5 is a flow chart illustrating a process according to one embodiment.

FIG. 5 is a flow chart illustrating a process 500, according to some embodiments, for evaluating possible cells for providing a coordinated service to UE 401.

In step s502, CS control function (CSCF) 410 identifies candidate TRPs for providing the coordinated service (CS) to the UE 401. In step s504, CSCF 410 evaluates whether the identified TRPs should start providing the CS to the UE. For example, in step s504, determines, based at least on one or more TAEs, whether the MRTD requirement ($MRTD_R$) can be met. If the requirement cannot be met, the process proceeds to step s506, where CSCF 410 sets a timer to expire after some amount of time (e.g., x seconds). After the timer expires, the process returns to step s502. If the requirement can be met, then CSCF 410 initiates the CS for the UE (step s508).

Figure 6:
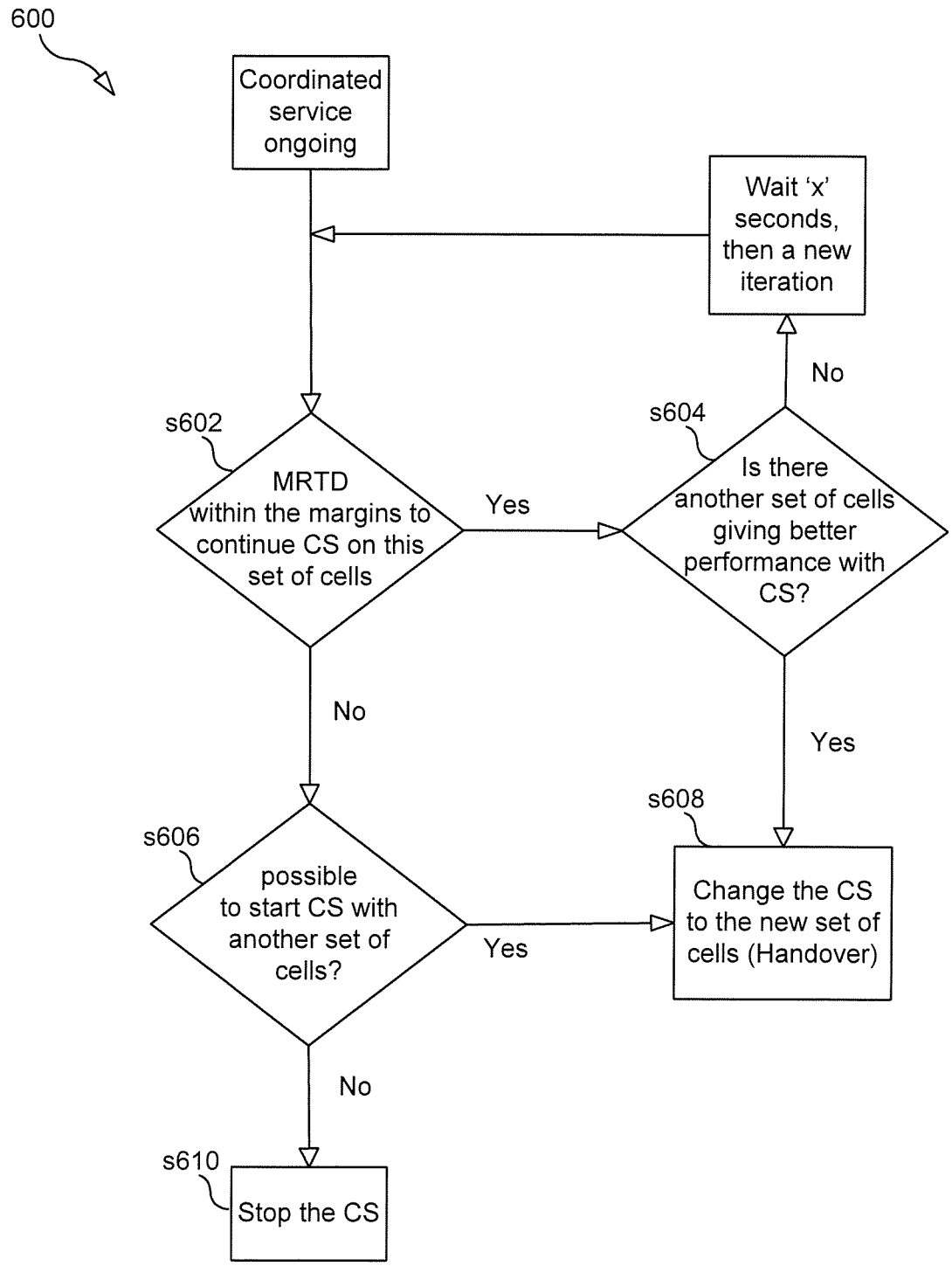
FIG. 6 is a flow chart illustrating a process according to one embodiment.

FIG. 6 is a flow chart illustrating a process 600, according to some embodiments, for evaluating whether to modify a CS (e.g., stop or change the CS) currently being provided to UE 401. As illustrated in FIG. 6, these evaluations a performed periodically (e.g., every x seconds) in order to be updated with mobility. The first evaluation (step s602) comprises checking whether the timing differences between the radio links is within the timing requirement ($MRTD_R$) or not. If it is within the timing requirement it is still good to evaluate whether there is a better set of cells to move the coordinated service to (step s604). When the time difference between the radio links is too big, it is evaluated whether it is possible to start the coordinated service on another set of cells (step s606). When it is decided that there is a better set of cells, the set of cells used in the coordinated service is changed (step s608) (e.g., the UE is handed over to one or more other cells). After the change the coordinated service is reevaluated after a predefined time. If there is no scenario in which the timing requirement can be met, then the CS is stopped (step s610).

A. Determine $MRTD_R$

Two approaches to determining required MRTD ($MRTD_R$) are described below.

1) $MRTD_R$ Dependent on Type of Service.

The advantage of this approach is that it requires no UE reporting, the disadvantage is that it cannot be fully conclusive.

For services like CoMP JT or MBSFN due to the nature of the service, i.e. same time and frequency resources are used from the two paths, it is not likely that the UE can separate them spatially. In this case $MRTD_R$=CP, the CP is a function of the SCS used and known by the base station.

For inter-band services, like inter band CA, assumptions of less strict UE architecture can be made, see examples in table 2 shown below.

TABLE 1

MRTD evaluation based on service

| Service | $MRTD_R$ | Comment |
|---|---|---|
| CoMP JT | <CP | |
| MBSFN | <ECP | |
| Intra band contiguous CA | <CP or Relaxed | Dependent UE Architecture |
| Intra band non-contiguous CA | Likely relaxed but could be CP | Dependent UE Architecture. In [3] 260 ns TAE + 30 us ΔTprop (9 km) |
| Inter band CA | Relaxed | In [3] 260 ns TAE + 30 us ΔTprop (9 km) |
| DC synchronous | Relaxed | In [3] 3 us TAE + 30 us ΔTprop (9 km) |
| DC synchronous intra band | <CP or Relaxed | |

2) $MRTD_R$ Reported by the Device (Expressly or Implicitly)

The UE may report a "Timing Class" from which conclusions about the MRTD requirement can be extracted. Example of pre-defined values "Timing Class" e.g. (not needed for some like CoMP and MBSFN):

Timing Class 1: MRTD within CP
Timing Class 2: MRTD=Half symbol duration
Timing Class 3: 33 us (todays DC with 9 km, mmWave-mmWave could be less)
Timing Class 4: No Timing constraints Alternatively, the UE reports $MRTD_R$, but this requires more bits than above approach with pre-defined values associated with different classes.

B. TAE Estimates

One way to estimate the TAE between the TRPs (e.g., base stations) involved in providing the CS to the UE is to use Over The Air Sync (OTA-S) (other methods for estimating the TAE can be used). OTA-S is the same as Radio Interface Based Synchronization (RIBS), but RIBS is used in 3GPP. RIBS has been standardized in 3GPP since Release 9, enhanced in Release 12 allowing means for interference rejection by exchange of muting information. Originally it was a solution introduced to tackle synchronization of TDD HeNBs.

Methods like proposed in PCT/IB2015/055449, entitled "Methods and system for synchronizing nodes in a wireless network," which improves RIBS through RTT measurement and time stamps also includes and compensates for inter base station propagation delays. PCT/SE2016/050262 and PCT/SE2016/050267 compensates propagation delays through geo coordinates.

OTA-S methods should be particularly well suited for coordinated services since the TAE is a timing relation towards neighboring base stations involved in the service (likely to hear each other).

The purpose here is not to provide a method for synchronizing nodes, rather it is getting an estimate of remaining TAE between neighboring nodes, when such synchronization method or other methods are used. Optimally, synchronizing different nodes with neighboring relations (including e.g. stratum classes) is a topic of its own e.g. covered in "Methods for optimal configuration of RIBS links" (PCT/SE2015/051378).

Figure 7:
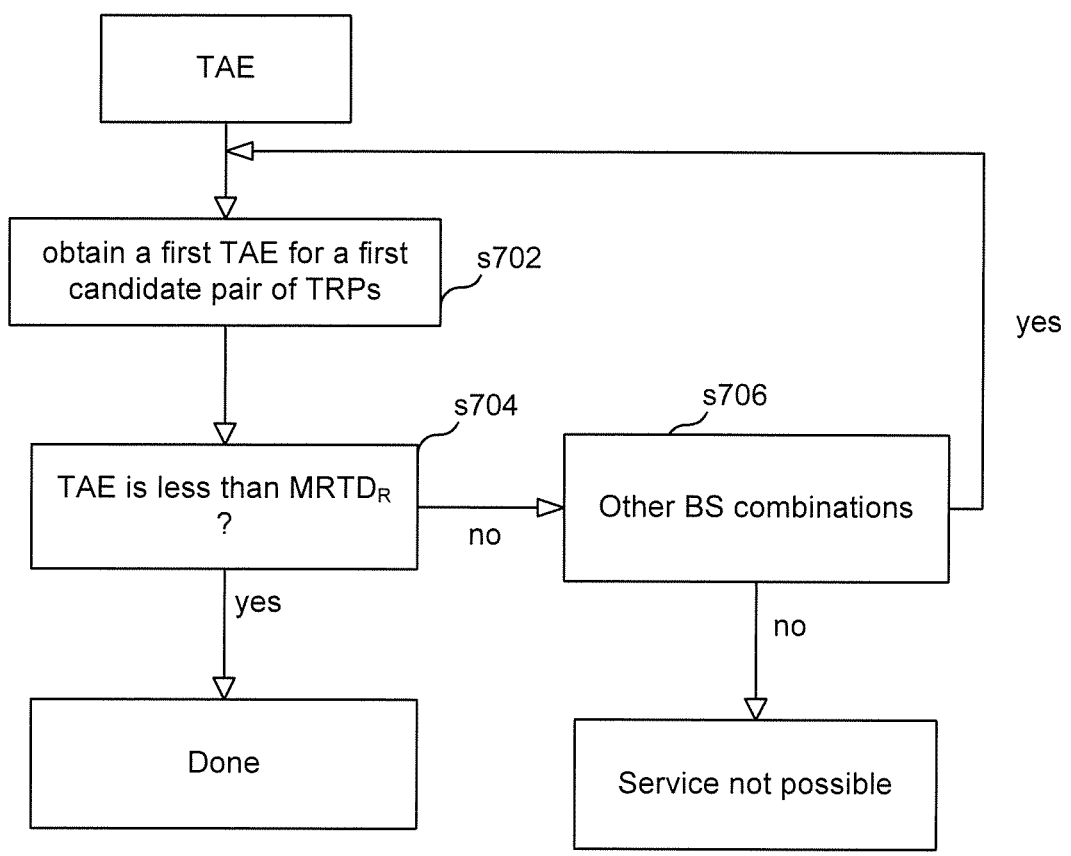
FIG. 7 is a flow chart illustrating a process according to one embodiment.

TAE estimates between neighbor base stations could be done on a periodic basis (dependent on expected drift) and generally available prior a specific service e.g. in a look up table. The data shall include a sign e.g. $TAE_{A-B}$ with a minus sign indicates node A is "early". A first rough order analysis of MRTD based on The TAE is shown in FIG. 7. It is rough since it does for example not consider the sign of the TAE (asymmetries and ΔTprop could compensate for TAE).

FIG. 7 illustrates steps that may be performed by CSCF 410 when it performs step s502 or step s602. In step s702, CSCF 410 obtains a first TAE for a first candidate pair of TRPs. In step s704, CSCF 410 determines whether the magnitude (i.e., absolute value) of the first TAE is less than $MRTD_R$. If it is not less than $MRTD_R$, then CSCF 410 determines whether there exist any other candidate pairs of TRPs (step s706). If so, the process proceeds back to step s702, in which a second TAE for the second candidate pair of TRPs is obtained. And then in step s704, CSCF 410 determines whether the magnitude of the second TAE is less than $MRTD_R$.

Information related to TAE could be exchanged directly between the base stations through an X2 like interface or by using a central node.

C. Delay Spread (DS)

The channel delay spread (DS) is only relevant for certain services (like CoMP) or UE architectures (like common FFT) where the $MRTD_R$ needs to be within the CP. Knowledge about channel properties is evaluated by the base station as part of normal channel assessment during communication with UEs, delay spread is part of channel estimates. Many future beam forming (BF) systems are expected to be TDD and make use of DL-UL channel reciprocity. This means the base station gets knowledge about both channel directions by receiving sounding reference signals in the uplink.

If one beam direction causes large DS then another beam direction with less DS could be considered i.e. both link quality and DS are considered in the selection process.

Delay spread data can be exchanged between base stations over X2 or similar links or through a central node.

As explained earlier, the channel delay spread is mainly a function of the cell environment in combination with UE position within the cell.

The cyclic prefix (CP), as shown earlier, is fixed for a selected numerology (LTE only has one CP if we exclude special cases using ECP) and needs to be large enough to cover a large set of different environments for a single link.

Figure 8:
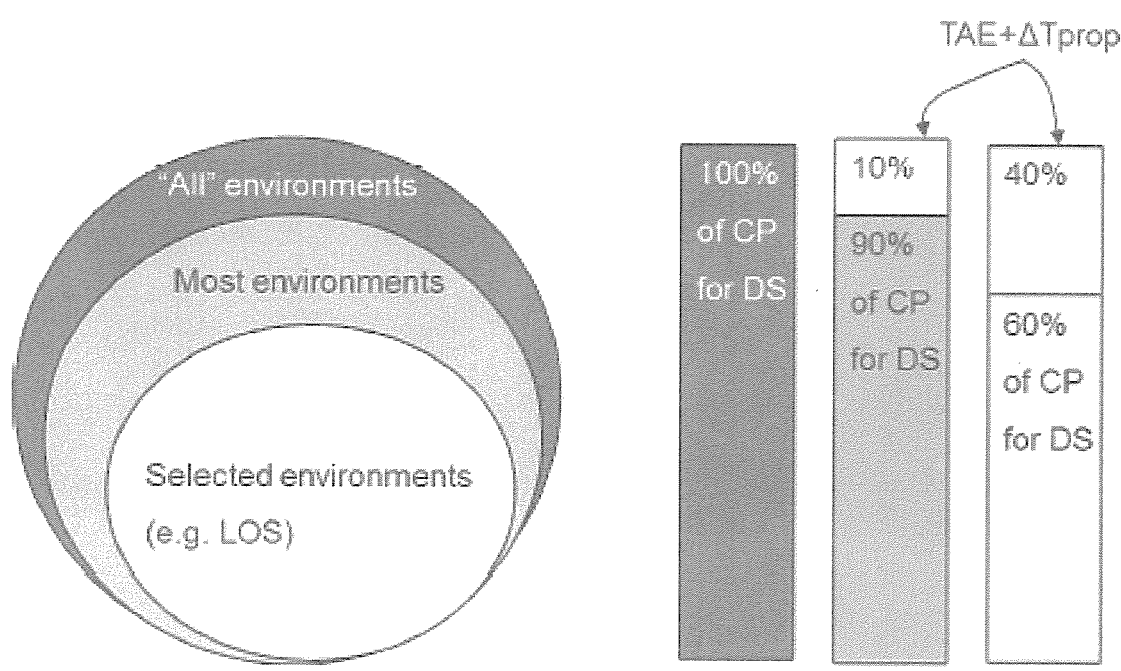
FIG. 8 illustrates margins after the channel delay spread.

For services like CoMP, where the ΔTprop+TAE in addition also needs to fit within the CP, the service can only be supported in environments where there is margin after the channel delay spread, see FIG. 8.

Figure 9:
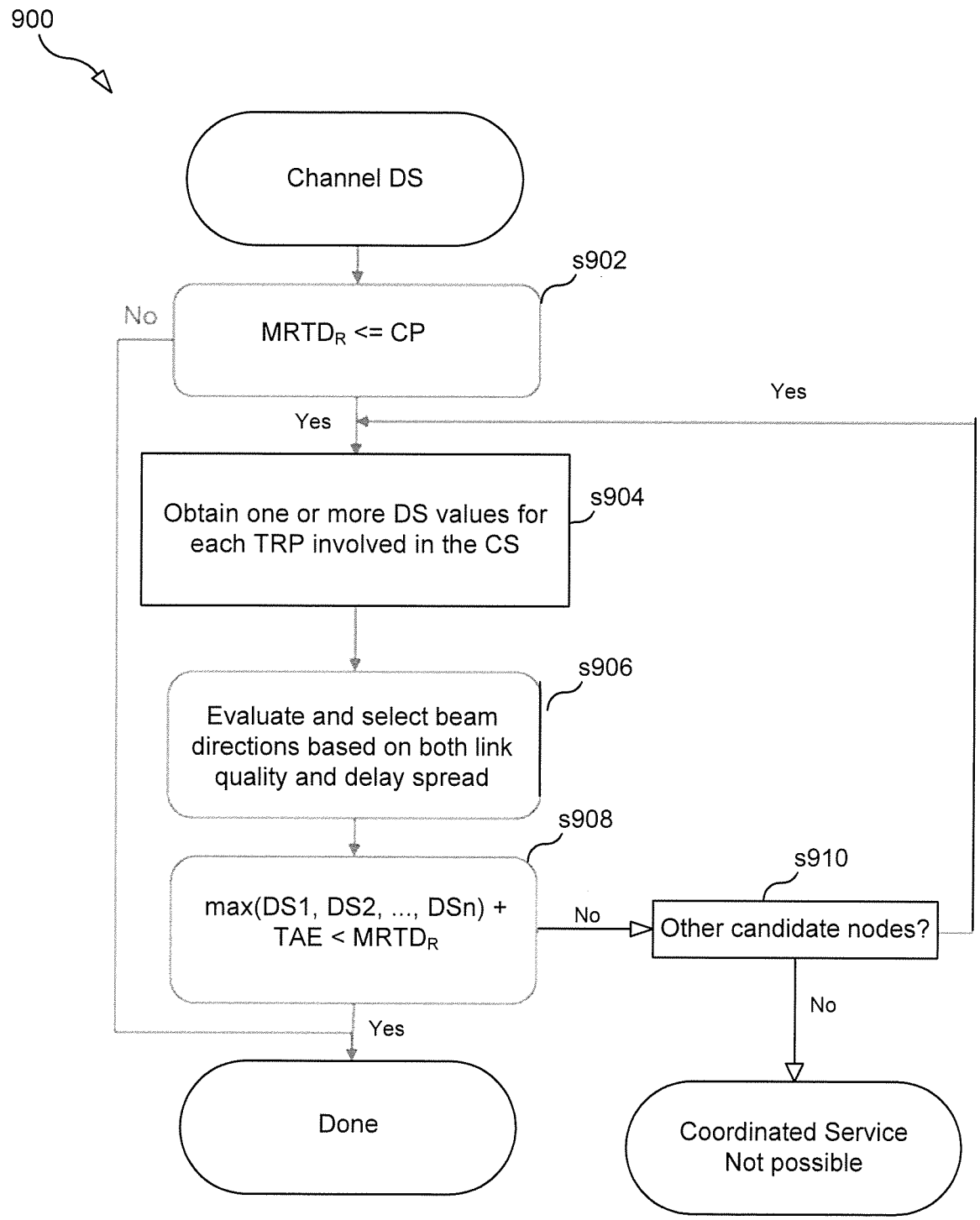
FIG. 9 is a flow chart illustrating a process according to one embodiment.

FIG. 9 is a flow chart illustrating a further process 900 that may be performed by CSCF 410 when it performs step s502 or step s602. In step s902, CSCF 410 determines whether $MRTD_R$ is less than or equal to the size of the CP. If $MRTD_R$ is less than or equal to the size of the CP, then the process continues to step s904, otherwise process 900 is complete. In step s904, CSCF 410 obtains one or more DS values for each TRP involved in the CS. In step s906, for each involved TRP, CSCF 410 selects a beam direction based on both link quality for the beam and the DS for the beam. In step s908, CSCF 410 determines whether max(DS1, DS2, . . . , DSn)+TAE <$MRTD_R$, where DS1 is one of the DS values for the first TRP involved (e.g., DS1 is the DS for the selected beam direction to be used by the first TRP), DS2 is one of the DS values for the second TRP involved, . . . , and DSn is one of the DS values for the nth TRP involved. If the timing requirement cannot be met (e.g., (max(DS1, DS2, DSn)+TAE)>$MRTD_R$,), then a new set of TRPs is selected (step s910) and the process repeats for this new set of TRPs.

D. Propagation Difference ΔTprop

A ΔTprop margin (ΔTpropM) is defined as ΔTpropM=$MRTD_R$–TAE or ΔTpropM=$MRTD_R$–TAE–DS (DS only relevant for CP related requirements).

Currently, it is possible to configure a base station with the position of its own antennas, as specified in [4]. In PCT/SE2016/050262 and PCT/SE2016/050267, methods for sharing antenna positioning information together with accuracy estimates is proposed. The purpose is different, it is for compensating propagation delays when using Over the Air synchronization between a source and target node. Here exchange of such data is needed as input for ΔTprop estimates in a coordinated service evaluation. Both a direct exchange of positions and related accuracy data e.g. through a X2 interface or through a centralized node could be considered.

For co-located TRPs (i.e. when antennas for the coordinated services are located within the same close physical area) the ΔTprop=0 and no further ΔTprop analysis is needed.

Figure 10:
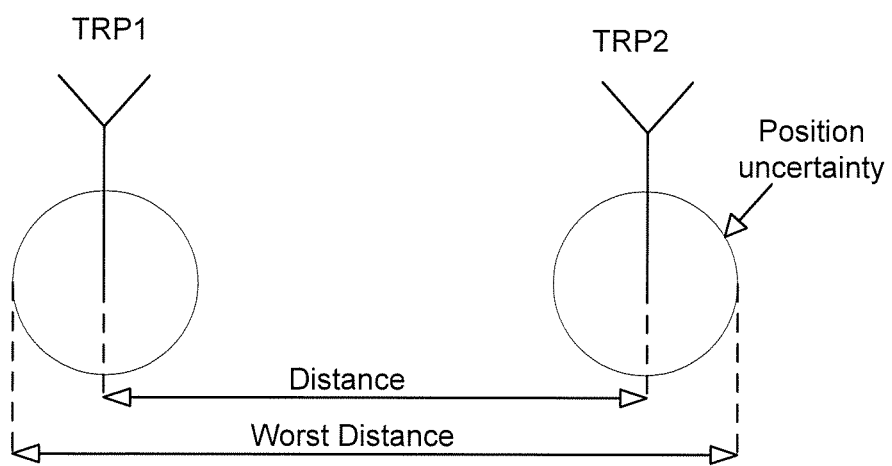
FIG. 10 illustrates co-located TRPs.

The definition of "same close physical area" and co-located TRPs would be determined by distance between the TRPs as shown in FIG. 10, which shows two co-located TRPs (i.e., TRP1 and TRP2).

The distance could be derived from positioning data and take uncertainties into account. Transmission points are considered co-located if distance is less than a pre-defined threshold. Since base station generally are stationary and information change on slow basis, information whether a set of base station are co-located or not co-located could e.g. be stored and requested directly from a common central entity like OAM.

D.1. Analysis without ΔTprop Estimates

The ΔTprop can easily be converted to a physical delta distance by multiplying with speed of light (c). Normally due to pathloss, coordinated services are used at cell edge between the cells. This is shown as an example in FIG. 11 as half of the Inter Site Distance (ISD). Note: Different cell arrangements can be used but it does not change the fundamentals.

The ISD can be derived through different methods like sharing BS geo coordinates as described earlier or through RTT RIBS measurements. Also, distance to respectively cell edge is considered known for each base station (BS).

Figure 12:
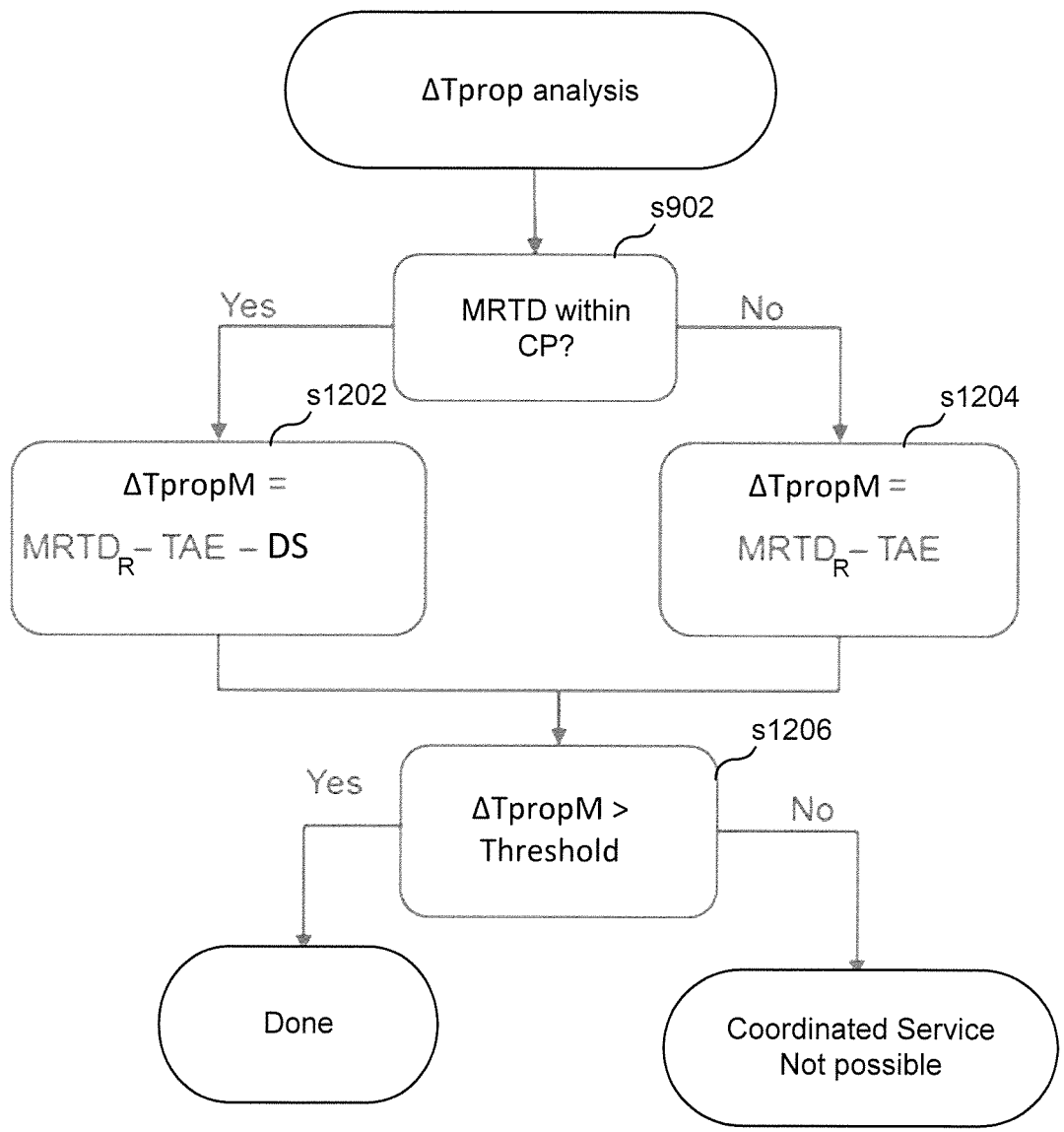
FIG. 12 is a flow chart illustrating a process according to one embodiment.

Therefore, a first rough evaluation of the service could be done without estimates of the ΔTprop as shown in the flow chart illustrated in FIG. 12. The Δ Tprop margin (Δ TpropM) gives an indication within how large area between the cells where timing wise the UE can be served. For co-located transmission points the thresholds=0 (no ΔTpropM needed), otherwise the threshold could e.g. be set based on: Fraction of cell radius and UE Mobility (small area and high mobility could be difficult).

Referring now to FIG. 12, FIG. 12 is a flow chart illustrating a further process 1200 that may be performed by CSCF 410 when it performs step s502 or step s602. Process 1200 may begin with step s902, in which, as described above, CSCF 410 determines whether $MRTD_R$ is less than or equal to the size of the CP. If it is, then the process continues to step s1202, otherwise to step s1204. In step s1202, CSCF 410 calculates ΔTpropM=$MRTD_R$–TAE–DS, where DS=max(DS1, . . . , DSn), as described above. In step s1204, CSCF 410 calculates ΔTpropM=$MRTD_R$–TAE. In step s1206, CSCF 410 compares ΔTpropM to a threshold. If ΔTpropM is not greater than the threshold, then the coordinated service is not possible (i.e., the CS should not be initiated for UE 401, or if the CS is currently being provided to the UE, the CS should be modified), otherwise it is possible (i.e., the CS may be initiated for the UE or if the CS is currently being provided to the UE, the CS does not need to be modified).

Figure 11:
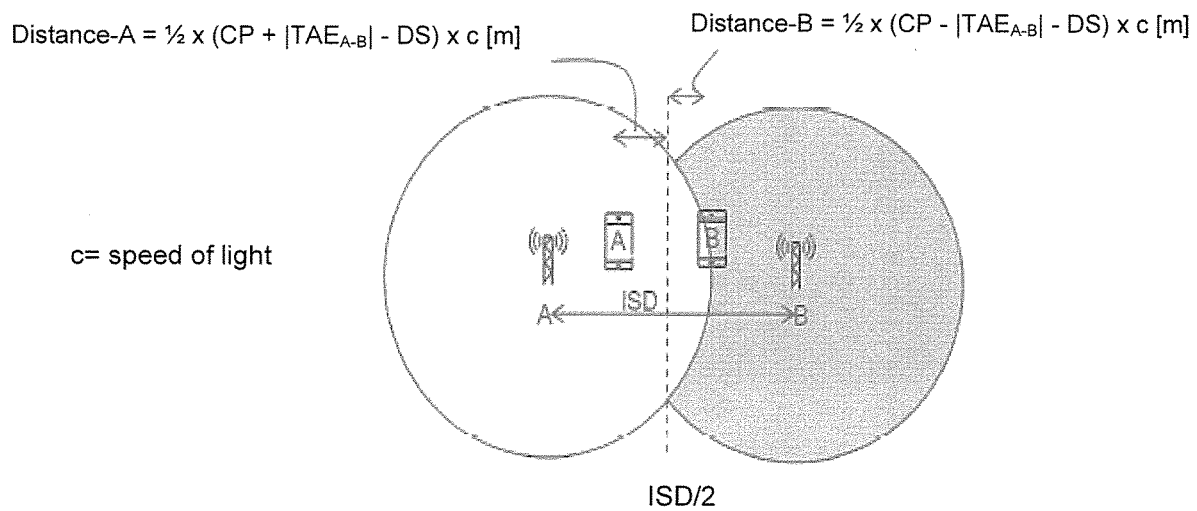
FIG. 11 illustrates an Inter Site Distance (ISD).
Figure 13:
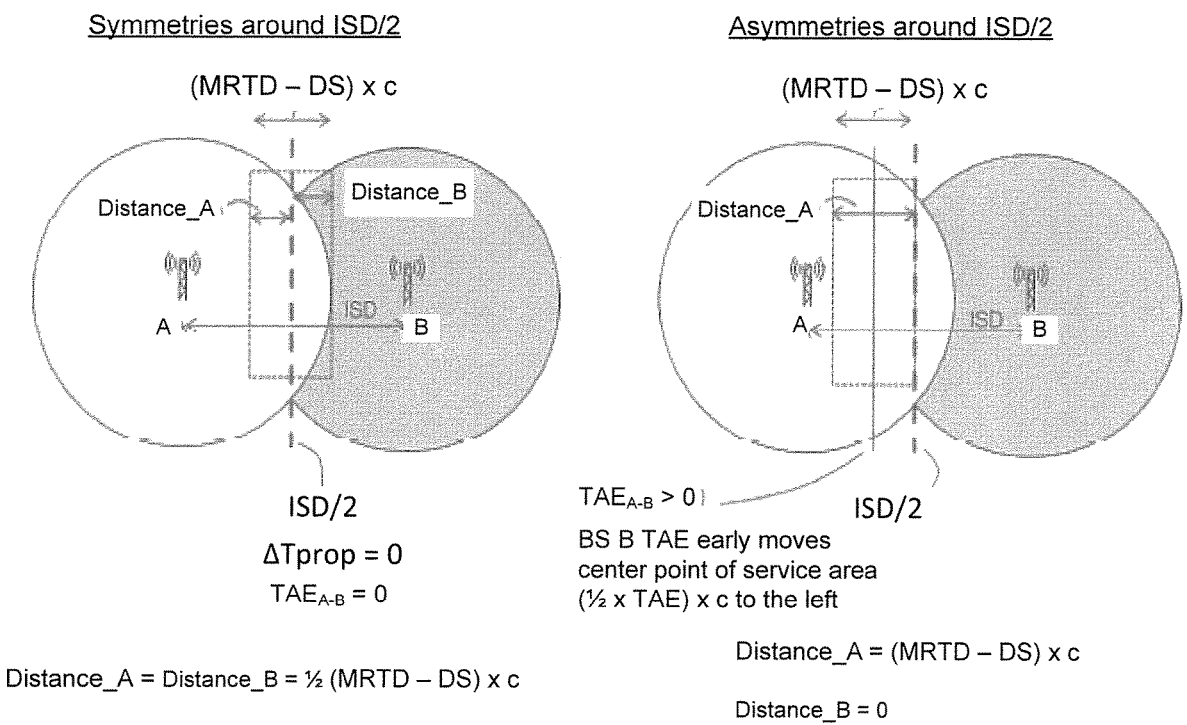
FIG. 13 illustrates a service area between to TRPs.

As shown in FIG. 11, the TAE creates asymmetries around the equidistant ISD/2 where timing still can be meet. As an example, if Distance-B in figure is equal to zero there will still be an area and distance from ISD/2 towards BS A where timing can be maintained. This since the early transmission from BS B is compensated by the longer propagation time from BS B towards the device. This is further illustrated in FIG. 13.

From a timing perspective the service area (dotted in FIG. 13) remains the same, however as the path loss increase as a function of distance from the base station the effective service area decreases where the device can be served by both base stations. As an example, the most left part of the service area in the right part of the figure—i.e. closer to BS A, might have too high path loss to be useful but this also depends of the BS transmission power. This is however a general pre-requisite taken care of by measurements prior to service.

Figure 14:
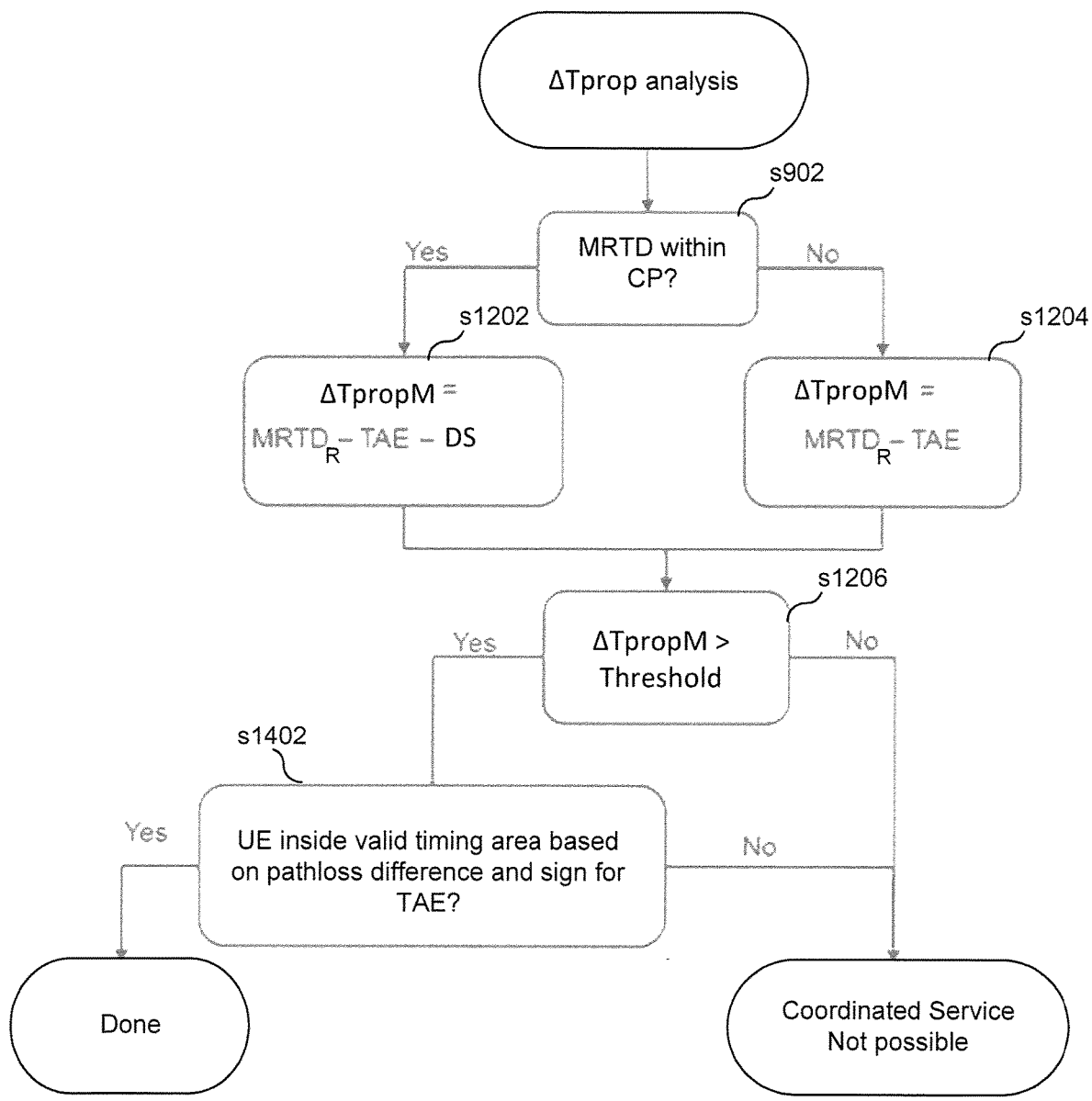
FIG. 14 is a flow chart illustrating a process according to one embodiment.

By knowing the sign of the TAE the "center" point for the service is known i.e. if it is closer to BS A than to BS B. What we do not know is if the UE is within the service area or not from a timing perspective. This can be estimated through the path loss estimates towards the UE and method in FIG. 12 could be refined as shown in FIG. 14. Path loss data can be exchanged e.g. through an X2 interface.

Referring now to FIG. 14, FIG. 14 is a flow chart illustrating a further process 1400 that may be performed by CSCF 410 when it performs step s502 or step s602. Process 1400 is the same as process 1200 with the exception that process 1400 further includes step s1402, which is performed if it is determined that ΔTpropM is greater than the threshold. In step s1402, CSCF 410 determines whether UE 401 is within a certain geographic area (e.g., a valid timing area determined from pathloss difference and sign for the TAE).

Figure 15:
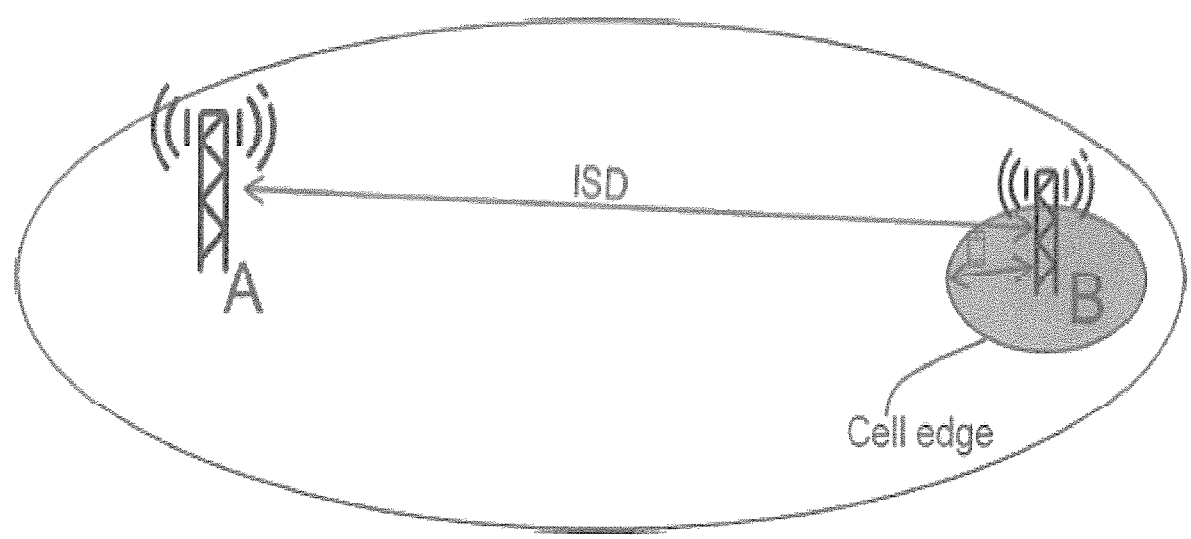
FIG. 15 illustrates a heterogeneous network.

For a heterogeneous deployment with a small cell within a larger cell, see FIG. 15, the same approach can be used but of course the device must be within coverage of both cells. For a heterogeneous deployment the analysis must at least allow ΔTpropM>(ISD−Small cell edge distance)/c, potentially even up to the ISD/c. For heterogeneous deployments where the large cell >>small cell becomes easier since: The UE will be within the small cell and hence its relative position is confined, and the $MRTD_R$ is not likely to have a dependency towards CP−ΔTpropM <$MRTD_R$−$TAE_{A-B}$.

A negative sign of $TAE_{A-B}$ implies A "early" i.e. somewhat compensates for the longer propagation distance from A and allows a relative larger ΔTprop. And from above the needed ΔTprop will be at least >(ISD−Small cell edge distance)/c.

D.2. Analysis with ΔTprop Estimates

Previous section made timing analysis of a coordinated service towards a UE based on estimates of remaining budget for ΔTprop (i.e., ΔTpropM), i.e. without using any method for deriving the ΔTprop. In this section methods for ΔTprop estimates are added improving overall confidence in analysis.

D.2.1 MRTD Analysis for a TA Based ΔTprop Approach

Figure 16:
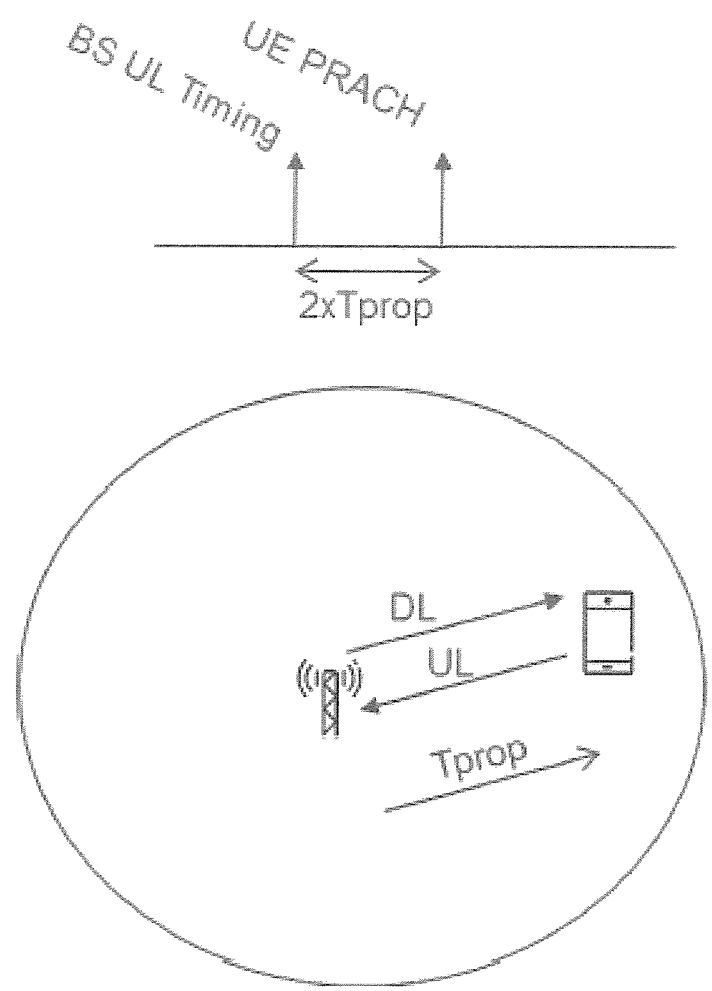
FIG. 16. illustrates that the PRACH is not perfectly aligned with the BS ideal UL timing.

For initial access the UE adjusts its PRACH transmission to the BS timing through the received DL. Due to RF distance between the BS and the UE the DL transmission arrives a Tprop later at the UE. Due to this, the PRACH is not perfectly aligned with the BS ideal UL timing, more precise it is 2×Tprop late (see FIG. 16). The BS measures the timing of the received PRACH and sends a Timing Advance (TA) command containing information how much the UE shall advance its UL timing. The RF propagation time towards the UE (Tprop) is half of the BS measured of the PRACH timing error. Many future beamforming systems in NR is expected to be TDD based with DL-UL reciprocity. This avoids DL-UL asymmetries and improves Tprop estimates.

If we disregard for asymmetries, then the remaining part is the UE DL to UL timing error and the base station receive time stamp accuracy. The base station receive time accuracy is normally very good and the worst-case UE timing error could be extracted from Table 3 (below) where half shall be used for the Tprop error (single path). As an example, for 120 kHz SCS the UE error would correspond to ~57 ns and sufficient small for Tprop estimates. Note: $T_c=1/(\Delta f_{max} \cdot N_f)$ with $\Delta f_{max}=480 \cdot 10^3$ Hz and $N_f=4096$ i.e. 0.5086 ns.

TABLE 3

| Frequency Range | SCS of SSB signals (KHz) | SCS of uplink signals s(KHz) | $T_e$ |
|---|---|---|---|
| 1 | 15 | 15 | [12]*64*$T_c$ |
|  |  | 30 | [10]*64*$T_c$ |
|  |  | 60 | [10]*64*$T_c$ |
|  | 30 | 15 | [8]*64*$T_c$ |
|  |  | 30 | [8]*64*$T_c$ |
|  |  | 60 | [7]*64*$T_c$ |

TABLE 3-continued

| Frequency Range | SCS of SSB signals (KHz) | SCS of uplink signals s(KHz) | $T_e$ |
|---|---|---|---|
| 2 | 120 | 60 | [3.5]*64*$T_c$ |
|  |  | 120 | [3.5]*64*$T_c$ |
|  | 240 | 60 | [3]*64*$T_c$ |
|  |  | 120 | [3]*64*$T_c$ |

Note 1:
$T_c$ is the basic timing unit defined in TS 38.211
Editor's note:
The final values of $T_e$ for 120 Hz SSB SCS are subject to further discussions in further meeting, and may not be outside 3*64*$T_c$ to 3.5*64*$T_c$.

Table 3 above corresponds to table 7.1.2-1 from 3GPP TS 38.133 V1.0.0.

The TA will be monitored and updated regularly based on UE mobility.

Figure 17:
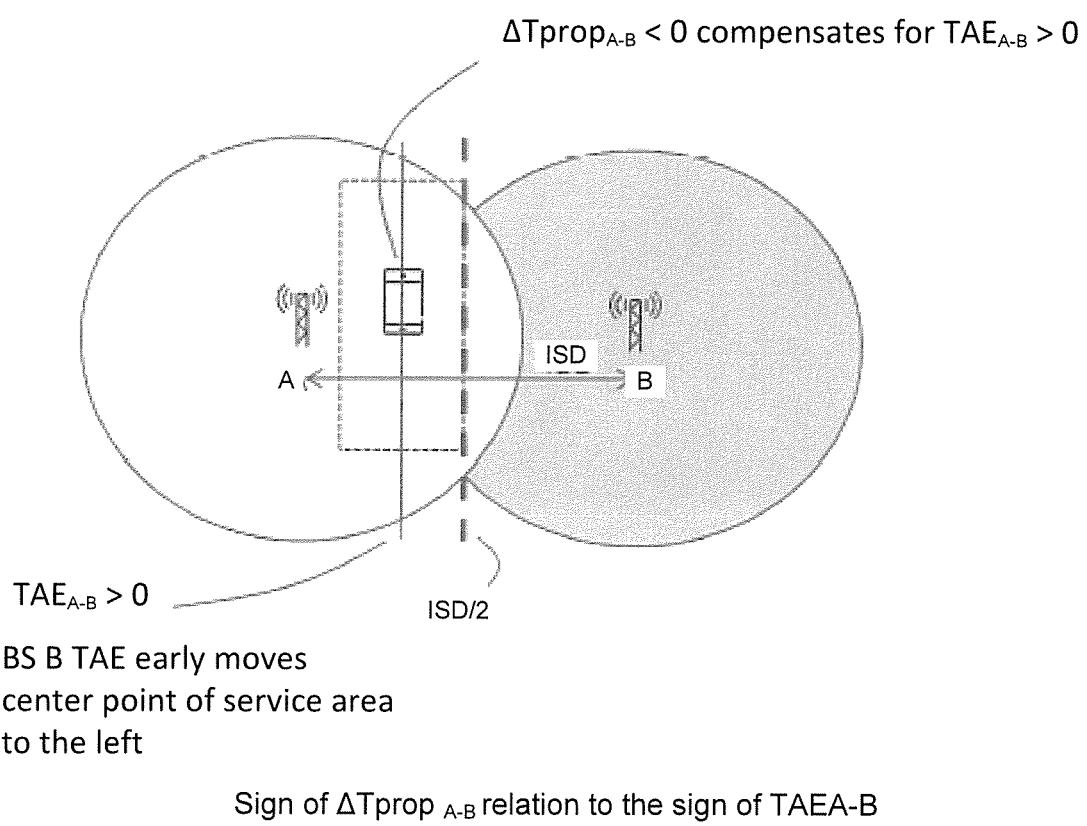
FIG. 17 illustrates that a difference in propagation delay can be offset by a difference in TAE.

For coordinated services like Dual Connectivity with multiple UE UL transmissions and TA to respectively BS-A and BS-B the $\Delta Tprop_{A-B}=(TA_{BS-A}-TA_{BS-B})/2$. The sign of $\Delta Tprop_{A-B}$ indicates if the UE is within the timing "service area" or not as seen in the MRTD budget and visualized in FIG. 17. Information about TA towards a specific UE could be exchanged between base stations, e.g. thorough X2 interface, updates based on UE mobility.

Figure 18:
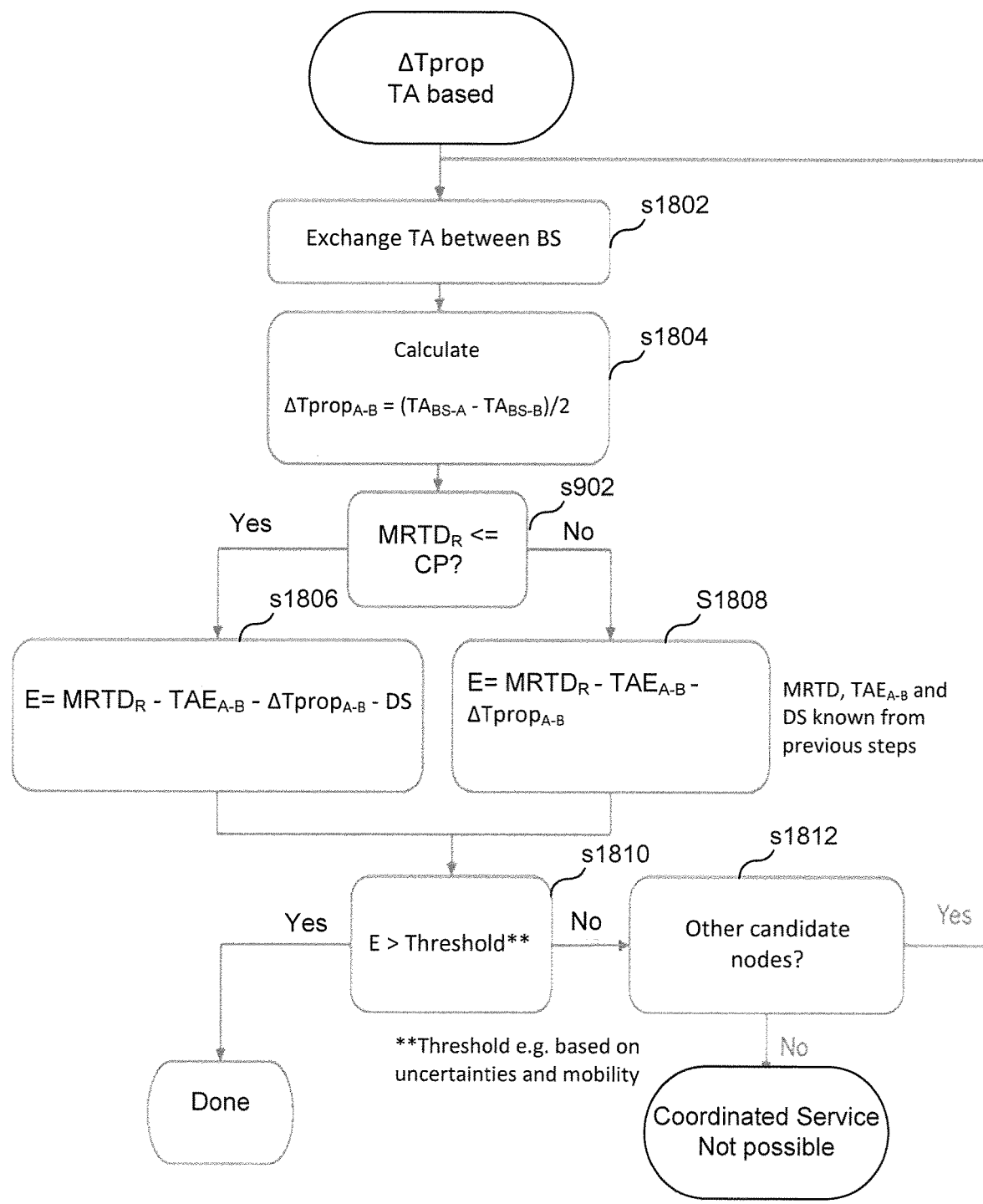
FIG. 18 is a flow chart illustrating a process according to one embodiment.

Referring now to FIG. 18, FIG. 18 is a flow chart illustrating a further process 1800 that may be performed by CSCF 410 when it performs step s502 or step s602. Process 1800 may begin with step s1802, in which CSCF 410 obtains $TA_{BS-A}$ and $TA_{BS-B}$, i.e., the timing advance value sent by BS A (e.g., TRP 405) to UE 401 and the timing advance value sent by BS B (e.g., TRP 40b) to UE 401, respectively. In step s1804, CSCF 410 calculates $\Delta Tprop_{A-B}=(TA_{BS-A}-TA_{BS-B})/2$.

After step s1804, the process proceeds to step s902, in which, as described above, CSCF 410 determines whether $MRTD_R$ is less than or equal to the size of the CP. If it is, then the process continues to step s1806, otherwise to step s1808. In step s1806, CSCF 410 calculates E=$MRTD_R$−$TAE_{A-B}$−$\Delta Tprop_{A-B}$−DS, where DS=max(DS1, . . . , DSn), as described above. In step s1808, CSCF 410 calculates E=$MRTD_R$−$TAE_{A-B}$−$\Delta Tprop_{A-B}$. In step s1810, CSCF 410 compares E to a threshold. If E is not greater than the threshold, then in step 1812 CSCF 410 selects another TRP pair (e.g., A and C) and performs the same analysis for the new pair. If there are no more pairs to select, the CS is not possible.

The threshold could be set for margins in estimate uncertainties and for mobility. If multiple TA are lacking e.g. since service might only use a single UL but multiple DL, different options still exists.

Figure 19:
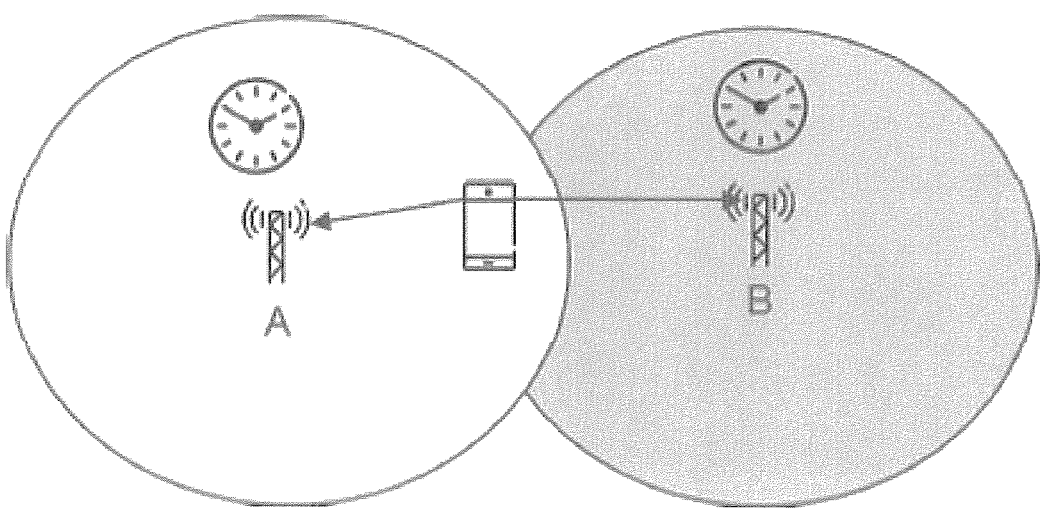
FIG. 19 illustrates TRP timestamping of a received UE signal.

D.2.2. ΔTprop Estimates Based on Single UE Transmission with BS Time Stamping A single and simultaneous UE transmission is received and time stamped at the base stations involved in the service, see FIG. 19. The ΔTprop can be extracted from the time stamps after compensation for the $TAE_{A-B}$. Similar approach as in FIG. 18 can be used for $MRTD_R$ analysis. The occurrence and signal pattern for the single UL transmission needs to be aligned between the nodes e.g. through an X2 interface. The approach can only be used if the BS can hear the UL transmission of the UE (normally implies operating at same frequencies).

D.2.3. ΔTprop Estimates Based on Path Loss Estimates

The path loss towards the UE would give an estimate of distance towards the UE and, thus, path loss data could be used for ΔTprop estimates. The quality of the path loss estimates depends of UE DL measurement accuracy and environments where LOS components give best estimates.

Other methods exist to derive ΔTprop estimates, all of which are applicable for the methods presented herein.

E. Post Processing of MRTD Component Statistics for Future Network Improvements.

E.1. TAE Improvements and Effect of Service Availability

If we look into the general formula for the MRTD: MRTD=TAE+ΔTprop or MRTD=max(DS1, . . . , DSn)+TAE+ΔTprop (DS only for CP related requirements), the ΔTprop and DS are properties related to environment, UE relative positions and deployments and not easy to change. Improving TAE can be done by improving existing synchronization solutions, generally at cost.

Statistics pertaining to failed attempts for setting up a specific coordinated service between a specific set of base stations are available. As an example, for a given CS (e.g., CS X) and given pair of TRPs (e.g., A and B), we may have data indicating the number of successful attempts at providing CS X (e.g., 4000) and data indicating the number of Failed attempts (e.g., 1000, i.e. a 20% failure rate).

Post processing and considering MRTD components for the failed attempts and effects of improved TAE:
0.9*TAE→Remaining failed attempts 500 i.e. 10%
0.5*TAE→Remaining failed attempts 200 i.e. 4%
0*TAE→Remaining failed attempts 150 i.e. 3% (i.e. cannot be resolved even with ideal TAE).

With such data available, effects of improved TAE through improved base station synchronization versus added cost could be judged versus the higher availability of the service.

E.2. Tuning TAE Between Base Stations

Instead of improving base station synchronization and thereby reducing the TAE as described above in E.1, the TAE between base stations could be reduced by fine adjusting the timing of individual base stations.

Figure 20:
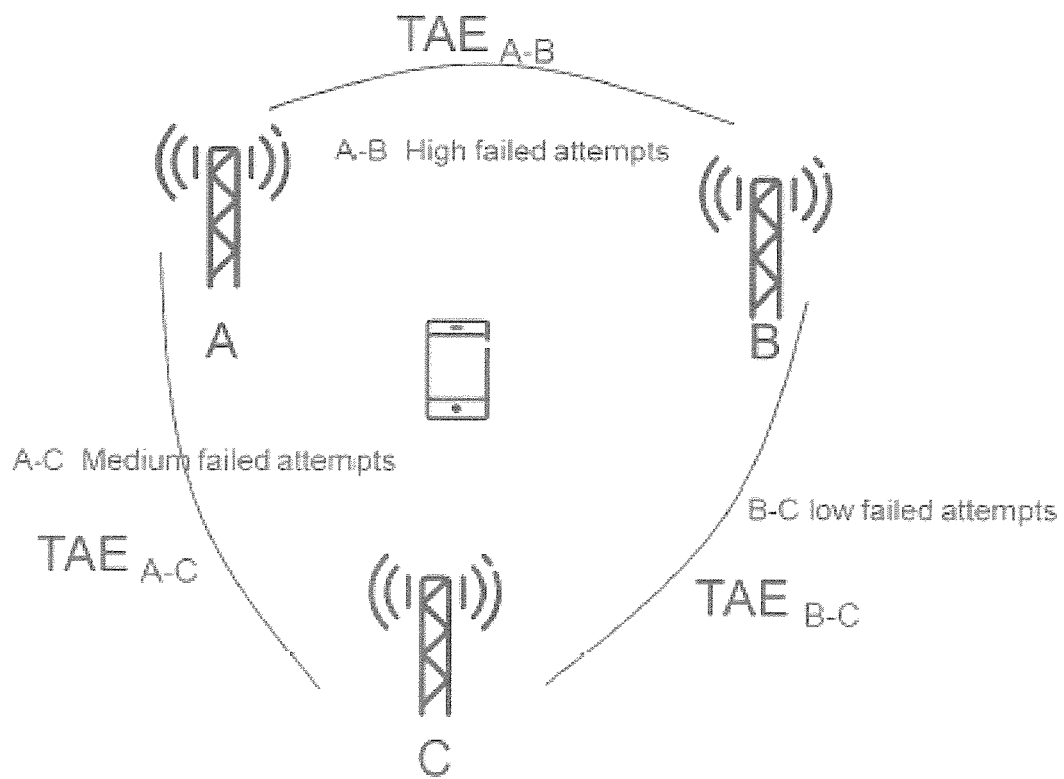
FIG. 20 illustrates three different TRP pairs.

The same approach as described above can be used to determine the effects of total reduced failed attempts per service and involved base stations. The TAE relations between a base station pair cannot be tuned isolated due to risk of sub optimizing and making TAE between other base stations worse. E.g. if coordinated services between base station A-B in FIG. 20 have a high number of failed attempts while B-C have a low with generally good MRTD margins, improving $TAE_{A-B}$ at expense of $TAE_{B-C}$ might be an option, post processing of data will assist such decisions.

E.3. Tuning Base Station Power

Figure 21:
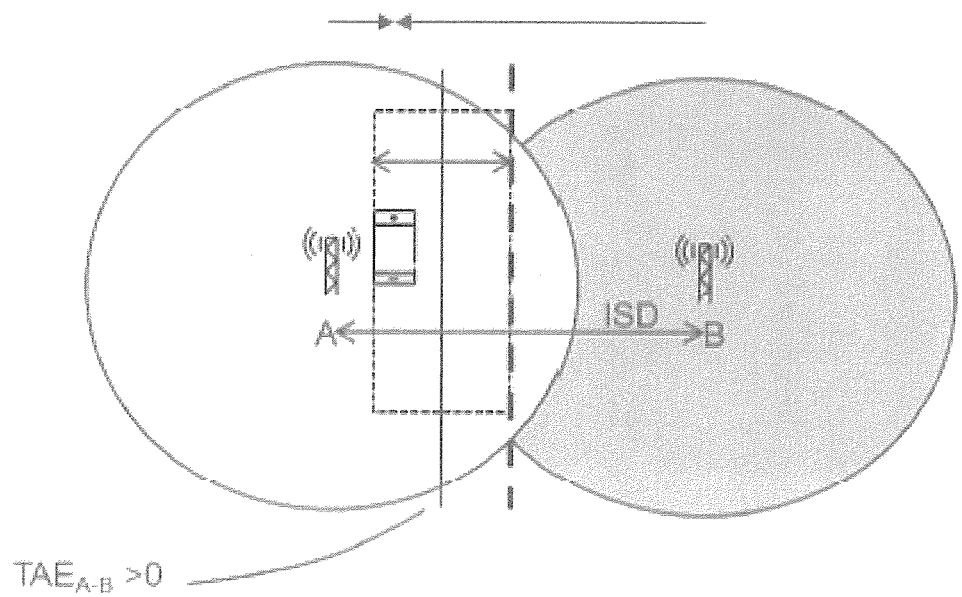
FIG. 21 illustrates off-centering a timing service area.

Based on post processing of MRTD data, conclusions can be made whether coordinated services generally are off-center between base station mid-point. This could be as shown earlier due to TAE misalignment and thereby off-centering the timing "service area" as shown in FIG. 21 or simply because it is more likely that more UEs are more likely positioned closer to one of the base stations (ΔTprop) or a combination of the two.

In any case, a pre-requisite for the service is that both paths have a sufficient high SNR. As shown in FIG. 21, for equal base station transmit power, the UE will, due to the higher path loss towards B, experience a relative lower SNR. Including SNR in the statistics would reveal cases when UE is within the timing budget but the service rejected due to low SNR caused by off-centering and thereby higher path-loss. For such cases a higher transmit power could be considered, for multi user MIMO (MU-MIMO) systems the DL could be improved by reducing the number of simultaneous users.

E.4. Tuning Service Decision Threshold Limits

In earlier flow charts like in FIG. 18, a threshold is used for margin in the MRTD budget. Such margin is needed based on mobility and uncertainties of the estimates of the MRTD individual components. If the quality of the service e.g. by storing measured throughput data post processing just after setting up the service, the effects of mobility could be considered small. Using the statistics and distribution for each service would relate the quality of service towards a MRTD margin and could therefore be used to tune the thresholds for more optimal future decisions. If the throughput generally shows good results even at cases close to the threshold level, threshold could be decreased to allow more service attempts. An estimate of future increase in successful attempts when using tuned threshold could be based on stored data for failed attempts.

Figure 22:
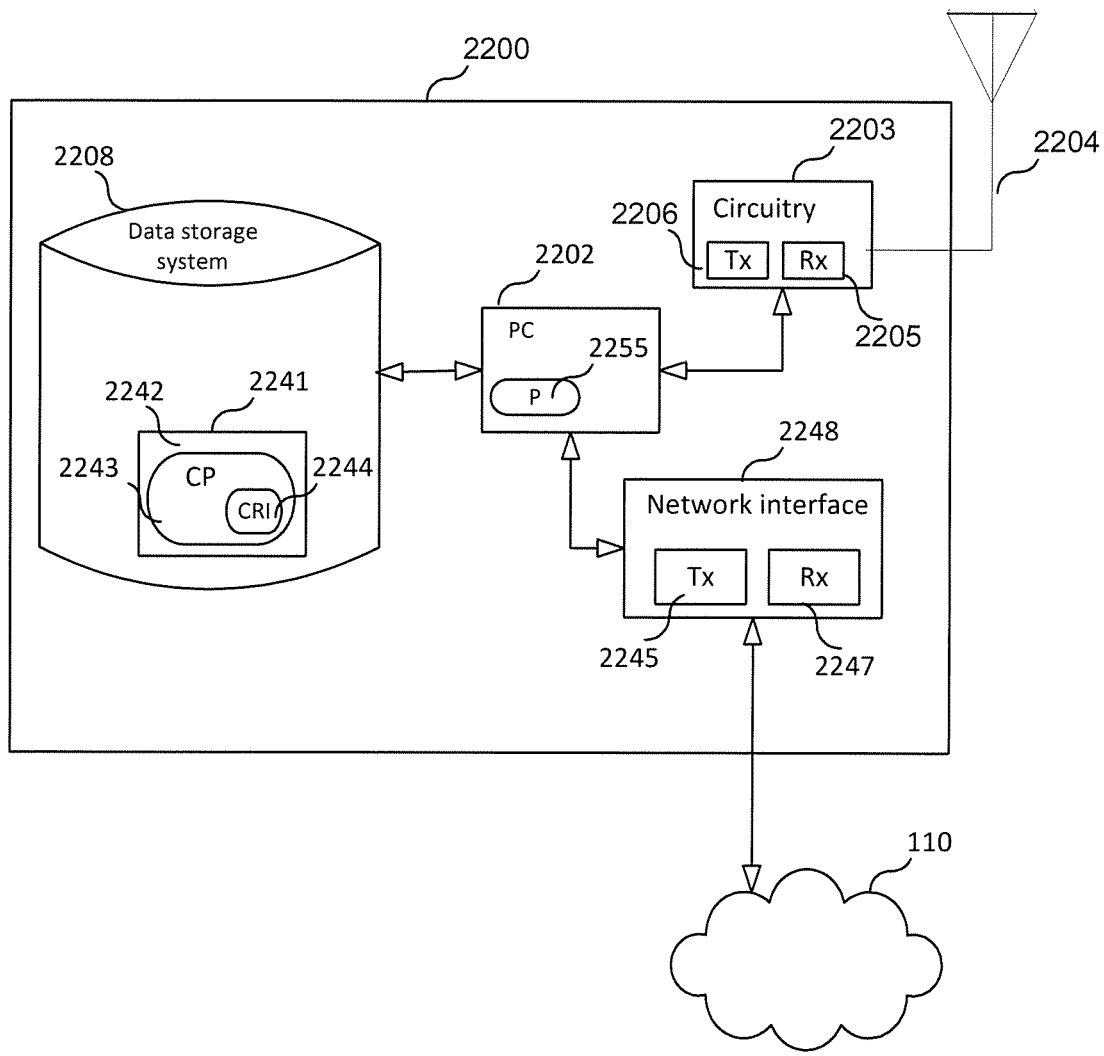
FIG. 22 is a block diagram of an access point according to one embodiment.

FIG. 22 is a block diagram of a network node 2200, according to some embodiments, for implementing CSCF 410. As shown in FIG. 22, the node 2200 may comprise: processing circuitry (PC) 2202, which may include one or more processors (P) 2255 (e.g., a general purpose microprocessor and/or one or more other processors, such as an application specific integrated circuit (ASIC), field-programmable gate arrays (FPGAs), and the like); a network interface 2248 comprising a transmitter (Tx) 2245 and a receiver (Rx) 2247 for enabling network node 2200 to transmit data to and receive data from other nodes connected to a network 110 (e.g., an Internet Protocol (IP) network) to which network interface 2248 is connected; circuitry 2203 (e.g., radio transceiver circuitry comprising an Rx 2205 and a Tx 2206) coupled to an antenna system 2204 for wireless communication with UEs); and local storage unit (a.k.a., "data storage system") 2208, which may include one or more non-volatile storage devices and/or one or more volatile storage devices (e.g., random access memory (RAM)). In embodiments where PC 2202 includes a programmable processor, a computer program product (CPP) 2241 may be provided. CPP 2241 includes a computer readable medium (CRM) 2242 storing a computer program (CP) 2243 comprising computer readable instructions (CRI) 2244. CRM 2242 may be a non-transitory computer readable medium, such as, but not limited, to magnetic media (e.g., a hard disk), optical media, memory devices (e.g., random access memory, flash memory), and the like. In some embodiments, the CRI 2244 of computer program 2243 is configured such that when executed by PC 2202, the CRI causes network node 2200 to perform steps described herein (e.g., steps described herein with reference to the flow charts and/or message flow diagrams). In other embodiments, network node 2200 may be configured to perform steps described herein without the need for code. That is, for example, PC 2202 may consist merely of one or more ASICs. Hence, the features of the embodiments described herein may be implemented in hardware and/or software.

Figure 23:
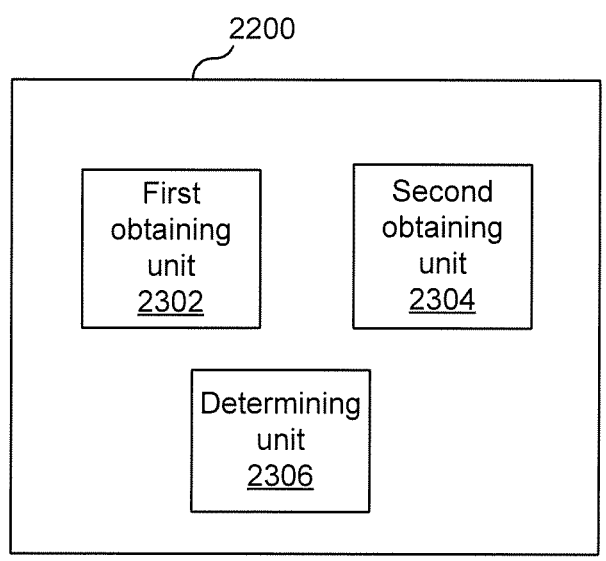
FIG. 23 is a diagram showing functional units of an access point according to one embodiment.

FIG. 23 is a diagram showing functional units of network node 2200 according to some embodiments. As shown in FIG. 23, network node 2200 includes a first obtaining unit 2302 for obtaining a timing requirement value ($MRTD_R$) representing a maximum received timing difference requirement; a second obtaining unit 2304 for obtaining a first timing alignment error value (TAE-1) indicating a timing alignment error between a first transmission and reception point (TRP) and a second TRP; and a determining unit 2306 for determining, based on at least the TAE-1 and the $MRTD_R$, whether to: initiate a coordinated service for a user equipment (UE) or modify a coordinated service currently being provided to the UE.

Figure 24:
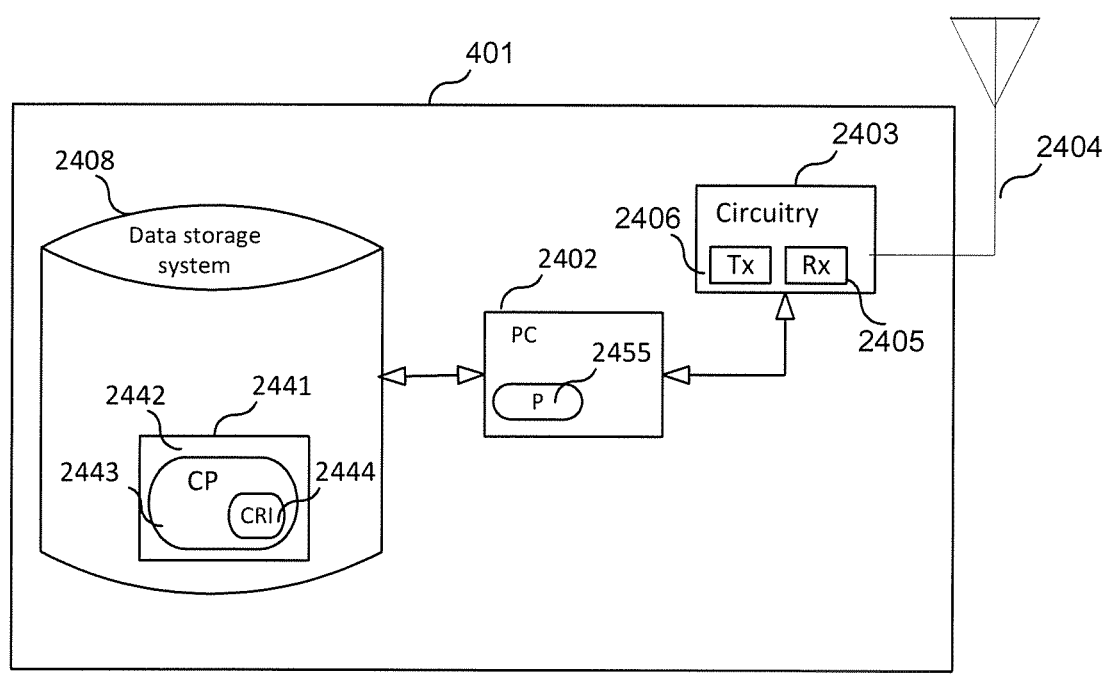
FIG. 24 is a block diagram of a UE according to one embodiment.

FIG. 24 is a block diagram of UE 401 according to some embodiments. As shown in FIG. 24, UE 401 may comprise: processing circuitry (PC) 2402, which may include one or more processors (P) 2455 (e.g., a general purpose microprocessor and/or one or more other processors, such as an application specific integrated circuit (ASIC), field-programmable gate arrays (FPGAs), and the like); circuitry 2403 (e.g., radio transceiver circuitry comprising a receiver (Rx) 2405 and a transmitter (Tx) 2406) coupled to an antenna system 2404 for wireless communication with access points and/or other UEs); and local storage unit (a.k.a., "data storage system") 2408, which may include one or more non-volatile storage devices and/or one or more volatile storage devices (e.g., random access memory (RAM)). In embodiments where PC 2402 includes a programmable processor, a computer program product (CPP) 2441 may be provided. CPP 2441 includes a computer readable medium (CRM) 2442 storing a computer program (CP) 2443 comprising computer readable instructions (CRI) 2444. CRM 2442 may be a non-transitory computer readable medium, such as, but not limited, to magnetic media (e.g., a hard disk), optical media, memory devices (e.g., random access memory, flash memory), and the like. In some embodiments, the CRI 2444 of computer program 2443 is configured such that when executed by PC 2402, the CRI causes UE 401 to perform steps described herein (e.g., steps described herein with reference to the flow charts and/or message flow diagrams). In other embodiments, UE 401 may be configured to perform steps described herein without the need for code. That is, for example, PC 2402 may consist merely of one or more ASICs. Hence, the features of the embodiments described herein may be implemented in hardware and/or software.

Figure 25:
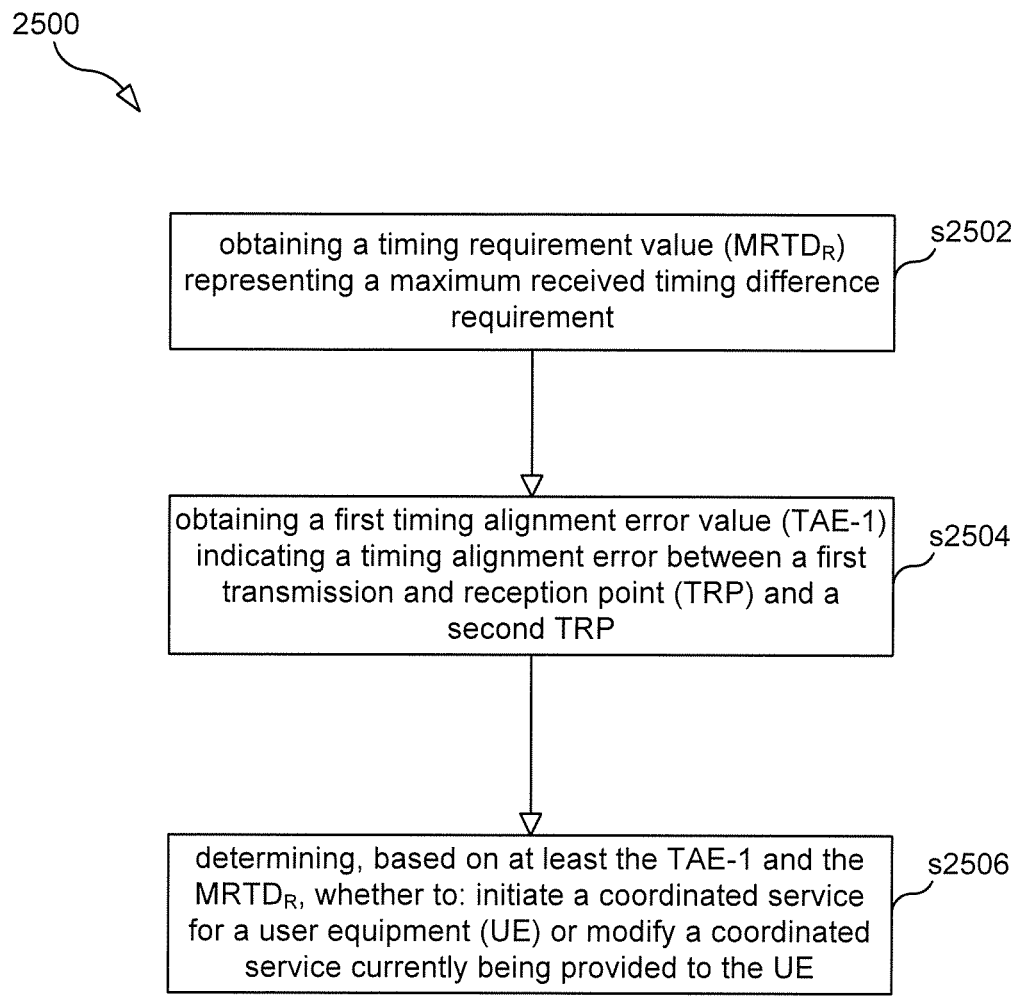
FIG. 25 shows a flow chart illustrating a process according to one embodiment.

FIG. 25 is a flow chart illustrating a CS process 2500 according to some embodiments. Process 2500 may begin in step s2502.

In step s2502, a timing requirement value ($MRTD_R$) representing a maximum received timing difference requirement is obtained.

In step s2504 a first timing alignment error value (TAE-1) indicating a timing alignment error between a first transmission and reception point (TRP) and a second TRP is obtained.

Step s2506 is a determining step in which it is determined whether to: initiate a coordinated service for a user equipment (UE) or modify a coordinated service currently being provided to the UE, wherein the determination is based on at least the TAE-1 and the $MRTD_R$.

In some embodiments, the step of obtaining $MRTD_R$ comprises determining a coordinated services type and, selecting an $MRTD_R$ that is associated with the determined coordinated services type. In other embodiments, the step of obtaining $MRTD_R$ comprises receiving a message transmitted by the UE, wherein the message comprises information indicating the $MRTD_R$ and information indicating that the $MRTD_R$ is applicable for the coordinated service.

In some embodiments, the process further comprises determining, based on at least the TAE-1 and the $MRTD_R$, whether to initiate a coordinated service for the UE, and this determining step comprises determining whether TAE-1 is less than $MRTD_R$. In such an embodiment, the process may further include, obtaining a second timing alignment error value (TAE-2) indicating a timing alignment error between the first TRP and a third TRP as a result of determining that TAE-1 is not less than $MRTD_R$, and determining, based on at least the TAE-2 and the $MRTD_R$, whether to initiate the coordinated service for the UE. In some embodiments, the method may include determining not to initiate the coordinated service for the UE as a result of determining that TAE-1 is not less than $MRTD_R$.

In some embodiments the first determining step (step s2506) comprises determining, based on at least the TAE-1 and the $MRTD_R$, a propagation time difference margin ($\Delta$TpropM), and determining whether $\Delta$TpropM is greater than a threshold. In such an embodiment the process may also include determining whether the UE is located within a valid timing area. In some embodiments, the determination as to whether the UE is located within the valid timing area is based on at least a pathloss difference and the sign of TAE-1.

In some embodiments, determining $\Delta$TpropM comprises calculating a) $\Delta$TpropM=$MRTD_R$-TAE-1 or b) $\Delta$TpropM=$MRTD_R$-TAE-1-DS-Max, where DS-Max is the maximum of a plurality of channel delay spreads values.

In some embodiments, process 2500 may further include the steps of: obtaining, for a channel between the first TRP and the UE, a first channel delay spread value (DS-1); obtaining, for a channel between the second TRP and the UE, a second channel delay spread value (DS-2); and determining DS-Max, wherein, if DS-1 is greater than DS-2, then DS-Max is greater than or equal to DS-1 (e.g., DS-Max=max(DS-1, DS-2) or DS-Max=max(DS-1, DS-2, . . . , DS-n)), wherein the step of determining whether to initiate a coordinated service for a user equipment (UE) or modify a coordinated service currently being provided to the UE is based on at least the TAE-1, DS-Max, and the $MRTD_R$. In some embodiments, the process further includes selecting a beam direction based on both a link quality associated with the beam and a channel delay spread value associated with the beam.

In some embodiments, the process also includes determining a potential network improvement based on a processing for statistics for MRTD budgets and service attempts.

In some embodiments, the process also includes determining a propagation time difference ($\Delta$Tprop), wherein the method comprises determining, based on at least the TAE-1, $\Delta$Tprop, and the $MRTD_R$, whether to: initiate a coordinated service for the UE or modify a coordinated service currently being provided to the UE. In some embodiments, the step of determining whether to initiate or modify the CS for the UE may comprises calculating E=$MRTD_R$-TAE-1-$\Delta$Tprop; and comparing E to a threshold. In some embodiments, the step of determining whether to initiate or modify a coordinated service for the UE may comprise calculating E=$MRTD_R$-TAE-1-$\Delta$Tprop-DS, wherein DS is a channel delay spread value; and comparing E to a threshold.

In some embodiments, determining $\Delta$Tprop comprises: obtaining a first timing advance (TA) value ($TA_{BS-A}$); obtaining a second timing advance (TA) value ($TA_{BS-B}$); and calculating $\Delta$Tprop=($TA_{BS-A}$-$TA_{BS-B}$)/2.

While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context. Further, the same principles described above can be used to evaluate a Maximum Transmit Timing Difference (MTTD) for a UE because the MTTD has a known relation to MRTD and if MRTD is fulfilled the MTTD shall be fulfilled.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

REFERENCES

[1] 3GPP TR 36.815
[2] 3GPP 36.104
[3] 3GPP 36.133
[4] 3GPP TS 28.632 V12.0.1, "Inventory Management (IM) Network Resource Model (NRM), Integration Reference Point (IRP); Information Service (IS)"

The invention claimed is:

1. A coordinated services method, the method comprising:
determining a coordinated services type;
based on the determined coordinated services type, selecting a maximum received timing difference requirement ($MRTD_R$) value that is associated with the determined coordinated services type, wherein the maximum received timing difference requirement ($MRTD_R$) values represents a maximum received timing difference requirement;
obtaining a first timing alignment error value (TAE-1) indicating a relative timing alignment error between a first transmission and reception point (TRP) and a second TRP; and
determining, based on at least the TAE-1 and the maximum received timing difference requirement ($MRTD_R$) value, whether to: initiate a coordinated service for a user equipment (UE) or modify a coordinated service currently being provided to the UE, wherein
determining whether to initiate the coordinated service or modify the coordinated service comprises:
determining, based on at least the TAE-1 and the $MRTD_R$ value, a first value; and
comparing the first value to a first threshold.

2. The method of claim 1, wherein
the method comprises determining, based on at least the TAE-1 and the $MRTD_R$ value, whether to initiate a coordinated service for the UE, and
the determining comprises determining whether TAE-1 is less than the $MRTD_R$ value.

3. The method of claim 2, further comprising:
as a result of determining that TAE-1 is not less than the $MRTD_R$ value, obtaining a second timing alignment error value (TAE-2) indicating a timing alignment error between the first TRP and a third TRP; and
determining, based on at least the TAE-2 and the $MRTD_R$ value, whether to initiate the coordinated service for the UE.

4. The method of claim 2, further comprising:
as a result of determining that TAE-1 is not less than the $MRTD_R$ value, determining not to initiate the coordinated service for the UE.

5. The method of claim 1, wherein
the first value is a propagation time difference margin ($\Delta TpropM$); and
comparing the first value to the first threshold comprises determining whether $\Delta TpropM$ is greater than the first threshold, and
$\Delta TpropM$ is a function of (M−TAE-1), wherein M is the $MRTD_R$ value.

6. The method of claim 5, wherein determining the first value comprises determining whether the UE is located within a valid timing area.

7. The method of claim 6, wherein the determination as to whether the UE is located within the valid timing area is based on at least a pathloss difference and the sign of TAE-1.

8. The method of claim 5, wherein
$\Delta TpropM = M - TAE-1$, or
$\Delta TpropM = M - TAE-1 - DS\text{-}Max$, where DS-Max is the maximum of a plurality of channel delay spreads values.

9. The method of claim 1, further comprising:
obtaining, for a channel between the first TRP and the UE, a first channel delay spread value (DS-1);
obtaining, for a channel between the second TRP and the UE, a second channel delay spread value (DS-2);
determining DS-Max, wherein, if DS-1 is greater than DS-2, then DS-Max is greater than or equal to DS-1, wherein
the method comprises determining, based on at least the TAE-1, DS-Max, and the $MRTD_R$ value, whether to: initiate a coordinated service for the UE or modify a coordinated service currently being provided to the UE.

10. The method of claim 9, further comprising selecting a beam direction based on both a link quality associated with the beam and a channel delay spread value associated with the beam.

11. The method of claim 1, further comprising determining a potential network improvement based on a processing for statistics for MRTD budgets and service attempts.

12. The method of claim 1, further comprising determining a propagation time difference ($\Delta Tprop$), wherein
the first value is determined using $\Delta Tprop$, TAE-1 and the $MRTD_R$ value.

13. The method of claim 12, wherein
the first value is E, wherein $E = M - TAE-1 - \Delta Tprop$, and wherein
M is the $MRTD_R$ value.

14. The method of claim 12, wherein
the first value is E, wherein $E = M - TAE-1 - \Delta Tprop - DS$, and wherein DS is a channel delay spread value
and M is the $MRTD_R$ value.

15. The method of claim 12, wherein determining $\Delta Tprop$ comprises:
obtaining a first timing advance (TA) value ($TA_{BS-A}$) and a second timing advance (TA) value ($TA_{BS-B}$) and calculating $\Delta Tprop = (TA_{BS-A} - TA_{BS-B})/2$, or
determining $\Delta Tprop$ based on pathloss estimates.

16. The method of claim 1, wherein the method comprises determining, based on at least the TAE-1 and the $MRTD_R$ value, whether to initiate the coordinated service for the UE.

17. A network node for optimizing coordinated services, the network node comprising:
a data storage system; and
processing circuitry coupled to the data storage system, wherein the network node is configured to:
obtain a maximum received timing difference requirement ($MRTD_R$) value representing a maximum received timing difference requirement;
obtain a first timing alignment error value (TAE-1) indicating a relative timing alignment error between a first transmission and reception point (TRP) and a second TRP; and
determine, based on at least the TAE-1 and the $MRTD_R$ value, whether to: initiate a coordinated service for a user equipment (UE) or modify a coordinated service currently being provided to the UE, wherein determining whether to: initiate the coordinated service or modify the coordinated service comprises:

determining, based on at least the TAE-1 and the $MRTD_R$ value, a first value; and comparing the first value to a first threshold, and the network node is configured to obtain the $MRTD_R$ value by performing a process that includes:

determining a coordinated services type and based on the determined coordinated services type, selecting an $MRTD_R$ that is associated with the determined coordinated services type, or receiving from the UE a message comprising information specifying the $MRTD_R$ value and information indicating that the specifying $MRTD_R$ value is applicable for the coordinated service.

18. A coordinated services method, the method comprising:

obtaining a maximum received timing difference requirement ($MRTD_R$) value representing a maximum received timing difference requirement;

obtaining a first timing alignment error value (TAE-1) indicating a relative timing alignment error between a first transmission and reception point (TRP) and a second TRP; and determining, based on at least the TAE-1 and the $MRTD_R$ value, whether to: initiate a coordinated service for a user equipment (UE) or modify a coordinated service currently being provided to the UE, wherein obtaining the maximum received timing difference requirement ($MRTD_R$) value comprises receiving from the UE a message comprising [i] information specifying the $MRTD_R$ value and [ii] information indicating that the specified $MRTD_R$ value is applicable for the coordinated service, and determining, based on at least the TAE-1 and the $MRTD_R$ value, whether to: initiate a coordinated service for a user equipment (UE) or modify a coordinated service currently being provided to the UE comprises:

determining, based on at least the TAE-1 and the $MRTD_R$ value, a first value; and comparing the first value to a first threshold.

\* \* \* \* \*